US012315430B2

(12) United States Patent
Niu et al.

(10) Patent No.: US 12,315,430 B2
(45) Date of Patent: May 27, 2025

(54) PIXEL CIRCUIT, DRIVE METHOD THEREFOR, DISPLAY SUBSTRATE, AND DISPLAY DEVICE

(71) Applicant: BOE Technology Group Co., Ltd., Beijing (CN)

(72) Inventors: Jinfei Niu, Beijing (CN); Minghua Xuan, Beijing (CN); Can Zhang, Beijing (CN); Can Wang, Beijing (CN); Ning Cong, Beijing (CN); Jingjing Zhang, Beijing (CN); Xiao Bai, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/029,106

(22) PCT Filed: Jun. 21, 2022

(86) PCT No.: PCT/CN2022/100175
§ 371 (c)(1),
(2) Date: Mar. 29, 2023

(87) PCT Pub. No.: WO2023/245432
PCT Pub. Date: Dec. 28, 2023

(65) Prior Publication Data
US 2025/0078727 A1 Mar. 6, 2025

(51) Int. Cl.
*G09G 3/32* (2016.01)

(52) U.S. Cl.
CPC ....... *G09G 3/32* (2013.01); *G09G 2300/0819* (2013.01); *G09G 2300/0852* (2013.01);
(Continued)

(58) Field of Classification Search
CPC ............ G09G 3/32; G09G 2300/0819; G09G 2300/0852; G09G 2300/0861;
(Continued)

(56) References Cited

U.S. PATENT DOCUMENTS

2021/0366364 A1 11/2021 Xuan et al.
2021/0375210 A1 12/2021 Xuan et al.
(Continued)

FOREIGN PATENT DOCUMENTS

CN 108538241 A 9/2018
CN 110021264 A 7/2019
(Continued)

*Primary Examiner* — Andrew Sasinowski
(74) *Attorney, Agent, or Firm* — Ling Wu; Stephan Yang; Ling and Yang Intellectual Property

(57) ABSTRACT

A pixel circuit, a driving method therefor, a display substrate and a display device are provided. The pixel circuit includes a drive circuit and a light emitting element connected in series between a first power supply terminal and a third power supply terminal; the drive circuit is used for providing a drive current and controlling a time length of conduction of a current path between the first power supply terminal and the third power supply terminal; the light emitting element is used for receiving the drive current in the current path and emitting light; the drive circuit includes a drive control sub-circuit, a light emitting control sub-circuit and a time-length control sub-circuit; the drive control sub-circuit is used for providing a drive current to the first node under control of the first scan signal terminal, the first data signal terminal and the second node.

20 Claims, 26 Drawing Sheets

(52) U.S. Cl.
CPC ............... *G09G 2300/0861* (2013.01); *G09G 2310/061* (2013.01); *G09G 2310/08* (2013.01); *G09G 2320/0233* (2013.01); *G09G 2320/0242* (2013.01)

(58) Field of Classification Search
CPC ......... G09G 2310/061; G09G 2310/08; G09G 2320/0233; G09G 2320/0242
See application file for complete search history.

(56) References Cited

U.S. PATENT DOCUMENTS

| | | | | |
|---|---|---|---|---|
| 2021/0407376 | A1 | 12/2021 | Yue et al. | |
| 2022/0005413 | A1 | 1/2022 | Yuan et al. | |
| 2022/0059021 | A1 | 2/2022 | Xuan et al. | |
| 2022/0139322 | A1 | 5/2022 | Wang et al. | |
| 2022/0215795 | A1 | 7/2022 | Yue et al. | |
| 2022/0328600 | A1* | 10/2022 | Dong | H10K 59/1216 |
| 2022/0343835 | A1 | 10/2022 | Cong et al. | |
| 2022/0415225 | A1* | 12/2022 | Yuan | G09G 5/18 |
| 2023/0386411 | A1* | 11/2023 | Wang | G09G 3/3233 |

FOREIGN PATENT DOCUMENTS

| | | | |
|---|---|---|---|
| CN | 110288949 | A | 9/2019 |
| CN | 110491334 | A | 11/2019 |
| CN | 110491335 | A | 11/2019 |
| CN | 111583873 | A | 8/2020 |
| CN | 112820236 | A | 5/2021 |
| CN | 112908247 | A | 6/2021 |
| CN | 113012634 | A | 6/2021 |
| CN | 113077751 | A | 7/2021 |
| CN | 113436570 | A | 9/2021 |
| CN | 113707077 | A | 11/2021 |
| WO | 2021026827 | A1 | 2/2021 |

* cited by examiner

PIXEL CIRCUIT, DRIVE METHOD THEREFOR, DISPLAY SUBSTRATE, AND DISPLAY DEVICE

CROSS-REFERENCE TO RELATED APPLICATION

The present application is a U.S. National Phase Entry of International Application PCT/CN2022/100175 having an international filing date of Jun. 21, 2022, and entitled "Pixel Circuit, Drive Method Therefor, Display Substrate, and Display Device". The entire contents of the above-identified applications are hereby incorporated by reference.

TECHNICAL FIELD

The present disclosure relates to the technical field of display, in particular to a pixel circuit, a method for driving the pixel circuit, a display substrate and a display device.

BACKGROUND

Silicon-based light emitting diode display devices are also called silicon-based LED display devices. Silicon-based LED display devices are manufactured by mature Complementary Metal Oxide Semiconductor (CMOS for short) integrated circuit process, which has advantages such as small size, high Pixels Per Inch (PPI for short), high refresh rate, etc. It is widely used in various fields such as medicine, military affairs, aerospace and consumer electronics, especially in fields such as wearable devices, Virtual Reality (VR for short) or Augmented Reality (AR for short) near-eye display.

SUMMARY

The following is a summary of subject matter described herein in detail. The summary is not intended to limit the protection scope of claims.

In a first aspect, the present disclosure provides a pixel circuit including: a drive circuit and a light emitting element connected in series between a first power supply terminal and a third power supply terminal; the drive circuit is configured to provide a drive current and control a time length of conduction of a current path between the first power supply terminal and the third power supply terminal; the light emitting element is configured to receive the drive current in the current path and emit light; the drive circuit includes a drive control sub-circuit, a light emitting control sub-circuit and a time-length control sub-circuit.

The drive control sub-circuit is electrically connected with a first scan signal terminal, a first data signal terminal, a first node and a second node respectively, and is configured to provide the drive current to the first node under control of the first scan signal terminal, the first data signal terminal and the second node.

The light emitting control sub-circuit is electrically connected with a light emitting signal terminal, the first power supply terminal and the second node respectively, and is configured to provide a signal of the first power supply terminal to the second node under control of the light emitting signal terminal.

The time-length control sub-circuit is electrically connected with a second scan signal terminal, a second data signal terminal, a second power supply terminal, the first node and a third node respectively, and is configured to provide a signal of the first node to the third node under control of the second scan signal terminal and the second data signal terminal.

The light emitting element is electrically connected with the third node and the third power supply terminal respectively.

In some possible implementation modes, when a signal of the first scan signal terminal is an effective level signal, a signal of the second scan signal terminal is an effective level signal, and a signal of the light emitting signal terminal is an ineffective level signal.

When the signal of the light emitting signal terminal is an effective level signal, the signals of the first scan signal terminal and the second scan signal terminal are ineffective level signals.

In some possible implementation modes, the drive control sub-circuit is further electrically connected with a third scan signal terminal, is configured to provide a drive current to the first node under control of the first scan signal terminal, the third scan signal terminal, the first data signal terminal and the second node.

When the signal of the first scan signal terminal is an effective level signal, a signal of the third scan signal terminal is an effective level signal.

When the signal of the light emitting signal terminal is an effective level signal, the signal of the third scan signal terminal is an ineffective level signal.

In some possible implementation modes, the pixel circuit further including: a reset sub-circuit and/or a node control sub-circuit.

The reset sub-circuit is electrically connected with a reset signal terminal, an initial signal terminal and the third node respectively, and is configured to provide a signal of the initial signal terminal to the third node under control of the reset signal terminal.

The node control sub-circuit is electrically connected with the first scan signal terminal, a control signal terminal and the first node respectively, and is configured to provide a signal of the control signal terminal to the first node or read the signal of the first node to the control signal terminal under control of the first scan signal terminal, wherein a voltage value of the signal of the control signal terminal is constant.

In some possible implementation modes, when a signal of the reset signal terminal is an effective level signal, signals of the first scan signal terminal, the second scan signal terminal and the light emitting signal terminal are ineffective level signals.

When the signal of the first scan signal terminal is an effective level signal, the signal of the reset signal terminal is an ineffective level signal.

When the signal of the light emitting signal terminal is an effective level signal, the signal of the reset signal terminal is an ineffective level signal.

In some possible implementation modes, the drive control sub-circuit includes: a first transistor, a second transistor, and a first capacitor.

A control electrode of the first transistor is electrically connected with a fourth node, a first electrode of the first transistor is electrically connected with the second node, and a second electrode of the first transistor is electrically connected with the first node.

A control electrode of the second transistor is electrically connected with the first scan signal terminal, a first electrode of the second transistor is electrically connected with the first data signal terminal, and a second electrode of the second transistor is electrically connected with the fourth node.

One plate of the first capacitor is electrically connected with the fourth node, and the other plate of the first capacitor is electrically connected with a fourth power supply terminal or the first node.

In some possible implementation modes, the drive control sub-circuit includes: a first transistor, a second transistor, a third transistor, and a first capacitor.

A control electrode of the first transistor is electrically connected with a fourth node, a first electrode of the first transistor is electrically connected with the second node, and a second electrode of the first transistor is electrically connected with the first node.

A control electrode of the second transistor is electrically connected with the first scan signal terminal, a first electrode of the second transistor is electrically connected with the first data signal terminal, and a second electrode of the second transistor is electrically connected with the fourth node.

A control electrode of the third transistor is electrically connected with the third scan signal terminal, a first electrode of the third transistor is electrically connected with the first data signal terminal, and a second electrode of the third transistor is electrically connected with the fourth node.

One plate of the first capacitor is electrically connected with the fourth node, and the other plate of the first capacitor is electrically connected with a fourth power supply terminal or the first node.

The second transistor and the third transistor are of different transistor types.

In some possible implementation modes, the light emitting control sub-circuit includes a fourth transistor.

A control electrode of the fourth transistor is electrically connected with the light emitting signal terminal, a first electrode of the fourth transistor is electrically connected with the first power supply terminal, and a second electrode of the fourth transistor is electrically connected with the second node.

In some possible implementation modes, the time-length control sub-circuit includes a fifth transistor, a sixth transistor, and a second capacitor.

A control electrode of the fifth transistor is electrically connected with a fifth node, a first electrode of the fifth transistor is electrically connected with the first node, and a second electrode of the fifth transistor is electrically connected with the third node.

A control electrode of the sixth transistor is electrically connected with the second scan signal terminal, a first electrode of the sixth transistor is electrically connected with the second data signal terminal, and a second electrode of the sixth transistor is electrically connected with the fifth node.

One plate of the second capacitor is electrically connected with the fifth node, and another plate of the second capacitor is electrically connected with the second power supply terminal.

In some possible implementation modes, the reset sub-circuit includes a seventh transistor.

A control electrode of the seventh transistor is electrically connected with the reset signal terminal, a first electrode of the seventh transistor is electrically connected with the initial signal terminal, and a second electrode of the seventh transistor is electrically connected with the third node.

In some possible implementation modes, the node control sub-circuit includes an eighth transistor.

A control electrode of the eighth transistor is electrically connected with the first scan signal terminal, a first electrode of the eighth transistor is electrically connected with the control signal terminal, and a second electrode of the eighth transistor is electrically connected with the first node.

In some possible implementation modes, the drive control sub-circuit includes: a first transistor, a second transistor, and a first capacitor, the light emitting control sub-circuit includes: a fourth transistor, and the time-length control sub-circuit includes: a fifth transistor, a sixth transistor, and a second capacitor.

A control electrode of the first transistor is electrically connected with a fourth node, a first electrode of the first transistor is electrically connected with the second node, and a second electrode of the first transistor is electrically connected with the first node.

A control electrode of the second transistor is electrically connected with the first scan signal terminal, a first electrode of the second transistor is electrically connected with the first data signal terminal, and a second electrode of the second transistor is electrically connected with the fourth node.

A control electrode of the fourth transistor is electrically connected with the light emitting signal terminal, a first electrode of the fourth transistor is electrically connected with the first power supply terminal, and a second electrode of the fourth transistor is electrically connected with the second node.

A control electrode of the fifth transistor is electrically connected with a fifth node, a first electrode of the fifth transistor is electrically connected with the first node, and a second electrode of the fifth transistor is electrically connected with the third node.

A control electrode of the sixth transistor is electrically connected with the second scan signal terminal, a first electrode of the sixth transistor is electrically connected with the second data signal terminal, and a second electrode of the sixth transistor is electrically connected with the fifth node.

One plate of the first capacitor is electrically connected with the fourth node, and the other plate of the first capacitor is electrically connected with a fourth power supply terminal or the first node.

One plate of the second capacitor is electrically connected with the fifth node, and the other plate of the second capacitor is electrically connected with the second power supply terminal.

In some possible implementation modes, the drive control sub-circuit includes: a first transistor, a second transistor, a third transistor, and a first capacitor, the light emitting control sub-circuit includes: a fourth transistor, and the time-length control sub-circuit includes: a fifth transistor, a sixth transistor, and a second capacitor.

A control electrode of the first transistor is electrically connected with a fourth node, a first electrode of the first transistor is electrically connected with the second node, and a second electrode of the first transistor is electrically connected with the first node.

A control electrode of the second transistor is electrically connected with the first scan signal terminal, a first electrode of the second transistor is electrically connected with the first data signal terminal, and a second electrode of the second transistor is electrically connected with the fourth node.

A control electrode of the third transistor is electrically connected with a third scan signal terminal, a first electrode of the third transistor is electrically connected with the first data signal terminal, and a second electrode of the third transistor is electrically connected with the fourth node.

A control electrode of the fourth transistor is electrically connected with the light emitting signal terminal, a first electrode of the fourth transistor is electrically connected with the first power supply terminal, and a second electrode of the fourth transistor is electrically connected with the second node.

A control electrode of the fifth transistor is electrically connected with a fifth node, a first electrode of the fifth transistor is electrically connected with the first node, and a second electrode of the fifth transistor is electrically connected with the third node.

A control electrode of the sixth transistor is electrically connected with the second scan signal terminal, a first electrode of the sixth transistor is electrically connected with the second data signal terminal, and a second electrode of the sixth transistor is electrically connected with the fifth node.

One plate of the first capacitor is electrically connected with the fourth node, and the other plate of the first capacitor is electrically connected with the fourth power supply terminal or the first node.

One plate of the second capacitor is electrically connected with the fifth node, and the other plate of the second capacitor is electrically connected with the second power supply terminal.

The second transistor and the third transistor are of opposite transistor types.

In some possible implementation modes, the pixel circuit further including: a reset sub-circuit and/or a node control sub-circuit, the drive control sub-circuit includes a first transistor, a second transistor and a first capacitor, the light emitting control sub-circuit includes a fourth transistor, the time-length control sub-circuit includes a fifth transistor, a sixth transistor and a second capacitor, the reset sub-circuit includes a seventh transistor, and the node control sub-circuit includes an eighth transistor.

A control electrode of the first transistor is electrically connected with a fourth node, a first electrode of the first transistor is electrically connected with the second node, and a second electrode of the first transistor is electrically connected with the first node.

A control electrode of the second transistor is electrically connected with the first scan signal terminal, a first electrode of the second transistor is electrically connected with the first data signal terminal, and a second electrode of the second transistor is electrically connected with the fourth node.

A control electrode of the fourth transistor is electrically connected with the light emitting signal terminal, a first electrode of the fourth transistor is electrically connected with the first power supply terminal, and a second electrode of the fourth transistor is electrically connected with the second node.

A control electrode of the fifth transistor is electrically connected with a fifth node, a first electrode of the fifth transistor is electrically connected with the first node, and a second electrode of the fifth transistor is electrically connected with the third node.

A control electrode of the sixth transistor is electrically connected with the second scan signal terminal, a first electrode of the sixth transistor is electrically connected with the second data signal terminal, and a second electrode of the sixth transistor is electrically connected with the fifth node.

A control electrode of the seventh transistor is electrically connected with a reset signal terminal, a first electrode of the seventh transistor is electrically connected with an initial signal terminal, and a second electrode of the seventh transistor is electrically connected with the third node.

A control electrode of the eighth transistor is electrically connected with the first scan signal terminal, a first electrode of the eighth transistor is electrically connected with a control signal terminal, and a second electrode of the eighth transistor is electrically connected with the first node.

One plate of the first capacitor is electrically connected with the fourth node, and the other plate of the first capacitor is electrically connected with a fourth power supply terminal or the first node; when the pixel circuit includes a node control sub-circuit, the other plate of the first capacitor is electrically connected with the first node.

One plate of the second capacitor is electrically connected with the fifth node, and the other plate of the second capacitor is electrically connected with the second power supply terminal.

In some possible implementation modes, the pixel circuit further including: a reset sub-circuit and/or a node control sub-circuit, the drive control sub-circuit includes: a first transistor, a second transistor, a third transistor and a first capacitor, the light emitting control sub-circuit includes a fourth transistor, the time-length control sub-circuit includes a fifth transistor, a sixth transistor and a second capacitor, the reset sub-circuit includes a seventh transistor, and the node control sub-circuit includes an eighth transistor.

A control electrode of the first transistor is electrically connected with a fourth node, a first electrode of the first transistor is electrically connected with the second node, and a second electrode of the first transistor is electrically connected with the first node.

A control electrode of the second transistor is electrically connected with the first scan signal terminal, a first electrode of the second transistor is electrically connected with the first data signal terminal, and a second electrode of the second transistor is electrically connected with the fourth node.

A control electrode of the third transistor is electrically connected with a third scan signal terminal, a first electrode of the third transistor is electrically connected with the first data signal terminal, and a second electrode of the third transistor is electrically connected with the fourth node.

A control electrode of the fourth transistor is electrically connected with the light emitting signal terminal, a first electrode of the fourth transistor is electrically connected with the first power supply terminal, and a second electrode of the fourth transistor is electrically connected with the second node.

A control electrode of the fifth transistor is electrically connected with a fifth node, a first electrode of the fifth transistor is electrically connected with the first node, and a second electrode of the fifth transistor is electrically connected with the third node.

A control electrode of the sixth transistor is electrically connected with the second scan signal terminal, a first electrode of the sixth transistor is electrically connected with the second data signal terminal, and a second electrode of the sixth transistor is electrically connected with the fifth node.

A control electrode of the seventh transistor is electrically connected with a reset signal terminal, a first electrode of the seventh transistor is electrically connected with an initial signal terminal, and a second electrode of the seventh transistor is electrically connected with the third node.

A control electrode of the eighth transistor is electrically connected with the first scan signal terminal, a first electrode of the eighth transistor is electrically connected with a control signal terminal, and a second electrode of the eighth transistor is electrically connected with the first node.

One plate of the first capacitor is electrically connected with the fourth node, and the other plate of the first capacitor is electrically connected with a fourth power supply terminal or the first node; when the pixel circuit includes the node control sub-circuit, the other plate of the first capacitor is electrically connected with the first node.

One plate of the second capacitor is electrically connected with the fifth node, and the other plate of the second capacitor is electrically connected with the second power supply terminal.

The second transistor and the third transistor are of opposite transistor types.

In some possible implementation modes, the light emitting element includes: a miniature light emitting diode or a mini light emitting diode.

In a second aspect, the present disclosure further provides a display substrate, which includes a display area provided with multiple pixels and a non-display area provided on and surrounding at least one side of the display area, and the pixel circuit described above is provided in the pixels.

In some possible implementation modes, the pixel circuit includes: a node control sub-circuit and the display substrate further includes: a first chip connected with a control signal terminal and a second chip connected with the first data signal terminal.

The first chip is configured to provide a signal to the control signal terminal in a display stage, read the signal of the control signal terminal in a non-display stage, and is further configured to obtain a threshold voltage of a first transistor according to the signal of the control signal terminal, generate a control signal according to the threshold voltage of the first transistor, and send the control signal to the second chip.

The second chip provides a signal to the first data signal terminal according to the control signal.

In a third aspect, the present disclosure further provides a display device, including the display substrate described above.

In a fourth aspect, the present disclosure further provides a method for driving a pixel circuit, which is configured to drive the pixel circuit described above, the pixel circuit is located in a display substrate, the display substrate has a display stage, the display stage includes multiple display frames, the display frame includes at least one display sub-frame; the at least one display sub-frame includes a light emitting data writing stage and a light emitting stage, and the method includes:

In the light emitting data writing stage, the drive control sub-circuit providing a drive current to the first node under control of the first scan signal terminal, the first data signal terminal and the second node, and the time-length control sub-circuit providing the signal of the first node to the third node under control of the second scan signal terminal and the second data signal terminal.

In the light emitting stage, the light emitting control sub-circuit providing the signal of the first power supply terminal to the second node under control of the light emitting signal terminal.

In some possible implementation modes, the pixel circuit further includes: a reset sub-circuit, the display sub-frame further includes: a reset stage, and the method further includes:

In the reset stage, the reset sub-circuit providing a signal of an initial signal terminal to the third node under control of a reset signal terminal.

In some possible implementation modes, the pixel circuit further includes a node control sub-circuit, the display substrate further includes a non-display stage, the non-display stage includes a compensation data writing stage and a compensation stage, the method further including:

In the light emitting data writing stage and the compensation data writing stage, the node control sub-circuit providing a signal of a control signal terminal to the first node under control of the first scan signal terminal In the compensation stage, the node control sub-circuit reading the signal of the first node to the control signal terminal under control of the first scan signal terminal.

Other aspects may be understood upon reading and understanding of the drawings and the detailed description.

BRIEF DESCRIPTION OF DRAWINGS

Accompanying drawings are used for providing understanding of technical solutions of the present disclosure, and form a part of the specification. They are used for explaining the technical solutions of the present disclosure together with the embodiments of the present disclosure, but do not form a limitation on the technical solutions of the present disclosure.

DETAILED DESCRIPTION

Figure 1:
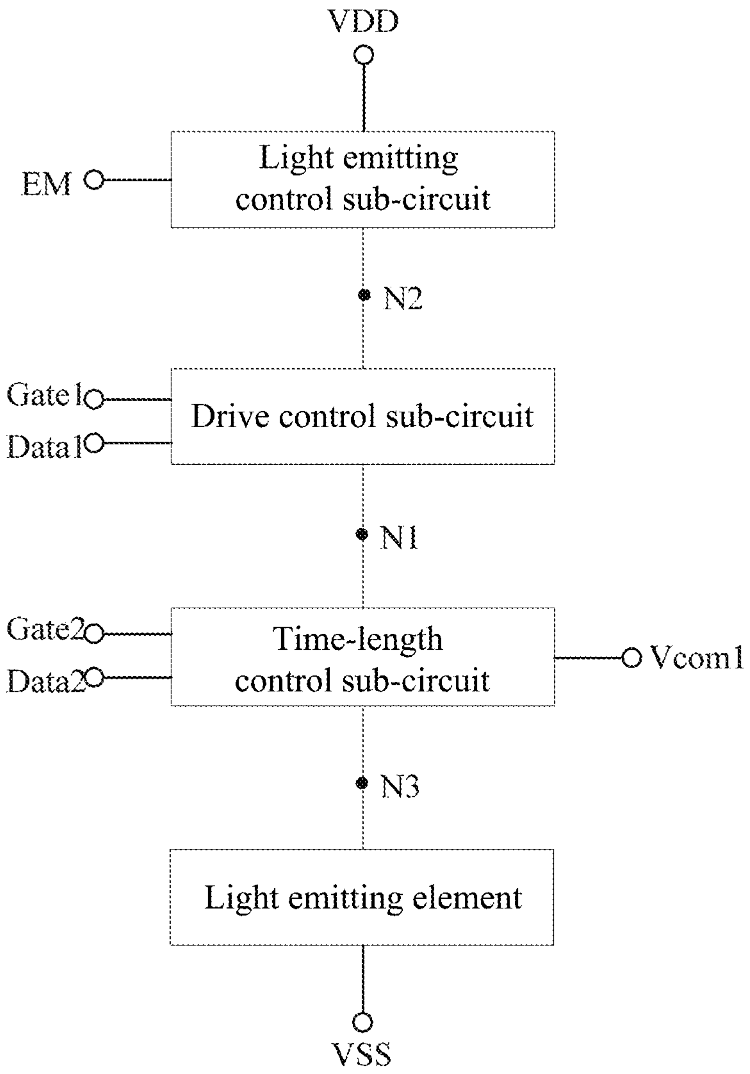
FIG. 1 is a schematic diagram of a structure of a pixel circuit according to an embodiment of the present disclosure.

To make objectives, technical solutions, and advantages of the present disclosure clearer, the embodiments of the present disclosure will be described in detail with reference to the accompanying drawings. It is to be noted that implementation modes may be implemented in multiple different forms. Those of ordinary skills in the art may easily understand such a fact that implementations modes and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other if there is no conflict. In order to keep following description of the embodiments of the present disclosure clear and concise, detailed descriptions about part of known functions and known components are omitted in the present disclosure. The drawings of the embodiments of the present disclosure only involve structures involved in the embodiments of the present disclosure, and other structures may refer to usual designs.

In the drawings, a size of each constituent element, a thickness of a layer, or a region is exaggerated sometimes for clarity. Therefore, one implementation mode of the present disclosure is not necessarily limited to the sizes, and shapes and sizes of various components in the drawings do not reflect actual scales. In addition, the drawings schematically illustrate ideal examples, and one implementation mode of the present disclosure is not limited to the shapes, numerical values, or the like shown in the drawings.

Ordinal numerals such as “first”, “second”, and “third” in the specification are set to avoid confusion between constituent elements, but not to set a limit in quantity.

In the specification, for convenience, wordings indicating orientation or positional relationships, such as “middle”, “upper”, “lower”, “front”, “back”, “vertical”, “horizontal”, “top”, “bottom”, “inside”, and “outside”, are used for illustrating positional relationships between constituent elements with reference to the drawings, and are merely for facilitating the description of the specification and simplifying the description, rather than indicating or implying that a referred device or element must have a particular orientation and be constructed and operated in the particular orientation. Therefore, they cannot be understood as limitations on the present disclosure. The positional relationships between the constituent elements may be changed as appropriate according to directions for describing the various constituent elements. Therefore, appropriate replacements may be made according to situations without being limited to the wordings described in the specification.

In the specification, unless otherwise specified and defined explicitly, terms “mount”, “mutually connect”, and “connect” should be understood in a broad sense. A connection may be a fixed connection, a detachable connection, or an integral connection. It may be a mechanical connection or an electrical connection. It may be a direct mutual connection, or an indirect connection through middleware, or an internal communication between two components. Those of ordinary skills in the art may understand specific meanings of these terms in the present disclosure according to specific situations.

In the specification, a transistor refers to an element which includes at least three terminals, i.e., a gate electrode, a drain electrode and a source electrode. The transistor has a channel region between the drain electrode (drain electrode terminal, drain region, or drain) and the source electrode (source electrode terminal, source region, or source), and a current can flow through the drain electrode, the channel region, and the source electrode. It is to be noted that, in the specification, the channel region refers to a region through which the current mainly flows.

In the specification, a first electrode may be a drain electrode, and a second electrode may be a source electrode. Or, the first electrode may be the source electrode, and the second electrode may be the drain electrode. In cases that transistors with opposite polarities are used, a current direction changes during operation of a circuit, or the like, functions of the “source electrode” and the “drain electrode” are sometimes interchangeable. Therefore, the “source electrode” and the “drain electrode” are interchangeable in the specification.

In the specification, “electrical connection” includes a case that constituent elements are connected together through an element with a certain electrical effect. The “element with the certain electrical effect” is not particularly limited as long as electrical signals may be sent and received between the connected constituent elements. Examples of the “element with the certain electrical effect” not only include electrodes and wirings, but also include switch elements such as transistors, resistors, inductors, capacitors, other elements with various functions, etc.

In the specification, “parallel” refers to a state in which an angle formed by two straight lines is above −10° and below 10°, and thus also includes a state in which the angle is above −5° and below 5°. In addition, “perpendicular” refers to a state in which an angle formed by two straight lines is above 80° and below 100°, and thus also includes a state in which the angle is above 85° and below 95°.

In the specification, a “film” and a “layer” are interchangeable. For example, a “conductive layer” may be replaced with a “conductive film” sometimes. Similarly, an “insulation film” may be replaced with an “insulation layer” sometimes.

In the present disclosure, “about” refers to that a boundary is defined not so strictly and numerical values within process and measurement error ranges are allowed.

Due to the non-uniform manufacturing process of light emitting diode elements, lighting up voltages of different light-emitting diode elements are inconsistent. In addition, electro-optic conversion characteristics (including efficiency, uniformity, color coordinates, etc.) of self-luminous elements are changed with the current, so that a display product including the light emitting diode elements performs displaying with non-uniform with a low light emitting efficiency, and a display effect of the display product is reduced.

FIG. 1 is a schematic diagram of a structure of a pixel circuit according to an embodiment of the present disclosure. As shown in FIG. 1, the pixel circuit according to an embodiment of the present disclosure includes: a drive circuit and a light emitting element connected in series between a first power supply terminal VDD and a third power supply terminal VSS. The drive circuit is configured to provide a drive current and control a time length of conduction of a current path between the first power supply terminal VDD and the third power supply terminal VSS. The light emitting element is configured to receive the drive current in the current path and emit light. The drive circuit includes a drive control sub-circuit, a light emitting control sub-circuit and a time-length control sub-circuit.

As shown in FIG. 1, the drive control sub-circuit is electrically connected with a first scan signal terminal Gate1, a first data signal terminal Data1, a first node N1 and a second node N2 respectively, and is configured to provide a drive current to the first node N1 under control of the first scan signal terminal Gate1, the first data signal terminal Data1 and the second node N2. The light emitting control sub-circuit is electrically connected with a light emitting signal terminal EM, the first power supply terminal VDD and the second node N2 respectively, and is configured to provide a signal of the first power supply terminal VDD to the second node N2 under control of the light emitting signal terminal EM. The time-length control sub-circuit is electrically connected with a second scan signal terminal Gate2, a second data signal terminal Data2, a second power supply terminal Vcom1, the first node N1 and a third node N3 respectively, and is configured to provide a signal of the first node N1 to the third node N3 under control of the second scan signal terminal Gate2 and the second data signal terminal Data2.

As shown in FIG. 1, the light emitting element is electrically connected with the third node N3 and the third power supply terminal VSS respectively.

In an exemplary embodiment, the first power supply terminal VDD continuously provides a high-level signal, and the second power supply terminal Vcom1 and the third power supply terminal VSS continuously provide low-level signals. Exemplarily, a voltage value of the signal of the second power supply terminal Vcom1 may be 0V, and a voltage value of the signal of the third power supply terminal VSS may be negative, for example, −2V.

In an exemplary embodiment, the light emitting element includes a first electrode and a second electrode. Exemplarily, the first electrode of the light emitting element is electrically connected with the third node N3, and the second electrode of the light emitting element is electrically connected with the third power supply terminal VSS.

In an exemplary embodiment, the light emitting element may be a miniature light emitting diode or a mini light emitting diode. A typical size (e.g. length) of the miniature light emitting diode may be less than 80 μm, e.g. 10 μm to 50 μm, and does not include a growth substrate (e.g. sapphire). A typical size (e.g. length) of the mini light emitting diode may be about 80 to 350 um, e.g. 100 to 220 um.

The pixel circuit in the present disclosure can control a light emitting time length of the light emitting element by the time-length control sub-circuit and the light emitting control sub-circuit in an interval where photoelectric parameters of the light emitting element are relatively stable.

In an exemplary embodiment, the pixel circuit in the present disclosure may be disposed on a silicon-based substrate. Being disposed on the silicon-based substrate, the pixel circuit in the present disclosure can achieve an improved electrical stability. Because the pixel circuit disposed on the silicon-based substrate has good electrical stability, the drive circuit in the pixel circuit disposed on the silicon-based substrate does not need to be provided with an internal compensation circuit, so that an area occupied by the drive circuit can be reduced, the PPI of a display product where the pixel circuit is located can be improved, a "screen window effect" can be avoided, and a display effect of the display product where the pixel circuit is located can be improved.

The pixel circuit according to the embodiment of the present disclosure includes: a drive circuit and a light emitting element connected in series between a first power supply terminal and a third power supply terminal. The drive circuit is configured to provide a drive current and control a time length of conduction of a current path between the first power supply terminal and the third power supply terminal. The light emitting element is configured to receive the drive current in the current path and emitting light. The drive circuit includes a drive control sub-circuit, a light emitting control sub-circuit and a time-length control sub-circuit. The drive control sub-circuit is electrically connected with a first scan signal terminal, a first data signal terminal, a first node and a second node respectively, and is configured to provide the drive current to the first node under control of the first scan signal terminal, the first data signal terminal and the second node. The light emitting control sub-circuit is electrically connected with a light emitting signal terminal, the first power supply terminal and the second node respectively, and is configured to provide a signal of the first power supply terminal to the second node under control of the light emitting signal terminal. The time-length control sub-circuit is electrically connected with a second scan signal terminal, a second data signal terminal, a second power supply terminal, the first node and a third node respectively, and is configured to provide a signal of the first node to the third node under control of the second scan signal terminal and the second data signal terminal. The light emitting element is electrically connected with the third node and the third power supply terminal respectively. In the present disclosure, by providing the light emitting control sub-circuit and the time-length control sub-circuit, the light emitting time length of the light emitting element can be controlled, uniformity and light emitting efficiency of the light emitting element under low gray scale is improved, and the display effect of the display product is improved.

In an exemplary embodiment, when a signal of the first scan signal terminal Gate1 is an effective level signal, a signal of the second scan signal terminal Gate2 is an effective level signal, and a signal of the light emitting signal terminal EM is an ineffective level signal. When the signal of the light emitting signal terminal EM is an effective level signal, the signals of the first scan signal terminal Gate1 and the second scan signal terminal Gate2 are ineffective level signals.

In an exemplary embodiment, a pixel circuit is disposed in a display substrate, and the display substrate has a display stage and a non-display stage.

In an exemplary embodiment, the display stage may include multiple display frames, and each display frame includes at least one display sub-frame. The display sub-frame includes a light emitting data writing stage and a light emitting stage. The display frame in the present disclosure includes at least one display sub-frame, which can realize multi-scanning in one frame, realizes flexible control of the light emitting time length of the light emitting element, improves uniformity of the pixel circuit under low gray scale, improves the contrast, and improves the display effect of the display product.

In an exemplary embodiment, the non-display stage may include a power-on stage, a power-off stage, and an idle stage between the display stages.

In an exemplary embodiment, time lengths of light emitting stages of different display sub-frames may be the same or may be different. When the time lengths of the light emitting stages of different display sub-frames are different, a time length of a light emitting stage of a later display sub-frame is shorter than that of an earlier display sub-frame, which can realize more accurate control of the light emitting time length of the light emitting element.

In an exemplary embodiment, in the light emitting data writing stage, the signal of the first scan signal terminal Gate1 and the signal of the second scan signal terminal Gate2 are effective level signals, and the signal of the light emitting signal terminal EM is an ineffective level signal. In the light emitting stage, the signal of the first scan signal terminal Gate1 and the signal of the second scan signal terminal Gate2 are ineffective level signals, and the signal of the light emitting signal terminal EM is an effective level signal.

Figure 2:
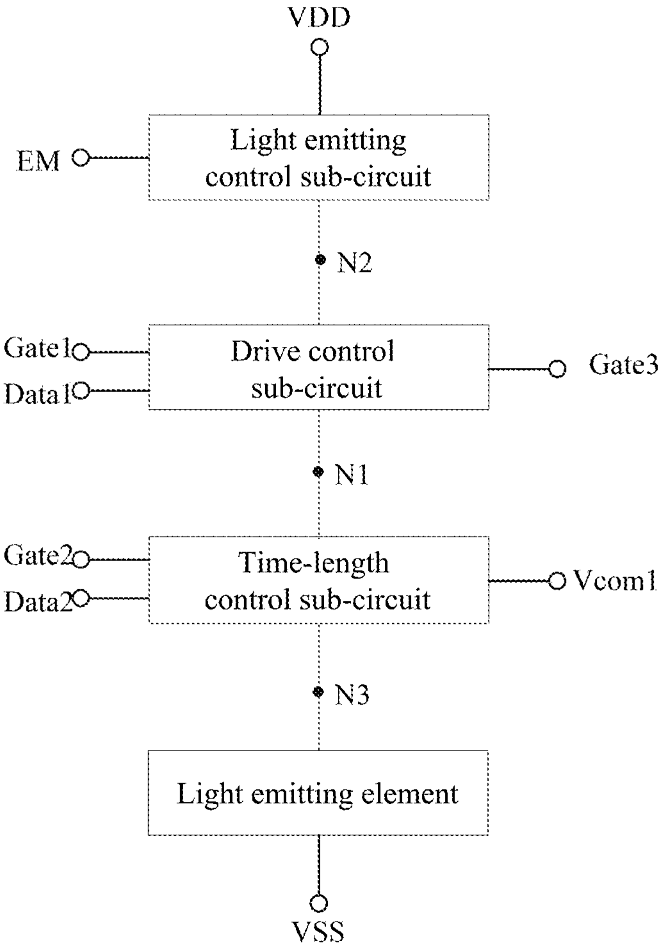
FIG. 2 is a schematic diagram of a structure of a pixel circuit according to an exemplary embodiment.

FIG. 2 is a schematic diagram of a structure of a pixel circuit according to an exemplary embodiment. As shown in FIG. 2, in an exemplary embodiment, the drive control sub-circuit is also electrically connected with the third scan signal terminal Gate3, and is configured to provide a drive current to the first node N1 under control of the first scan signal terminal Gate1, the third scan signal terminal Gate3, the first data signal terminal Data1 and the second node N2.

In an exemplary embodiment, when the signal of the first scan signal terminal Gate1 is an effective level signal, the signal of the third scan signal terminal Gate3 is an effective level signal, and when the signal of the light emitting signal terminal EM is an effective level signal, the signal of the third scan signal terminal Gate3 is an ineffective level signal.

In an exemplary embodiment, the signal of the third scan signal terminal Gate3 is an effective level signal in the light emitting data writing stage, and the signal of the third scan signal terminal Gate3 is an ineffective level signal in the light emitting stage.

Figure 3:
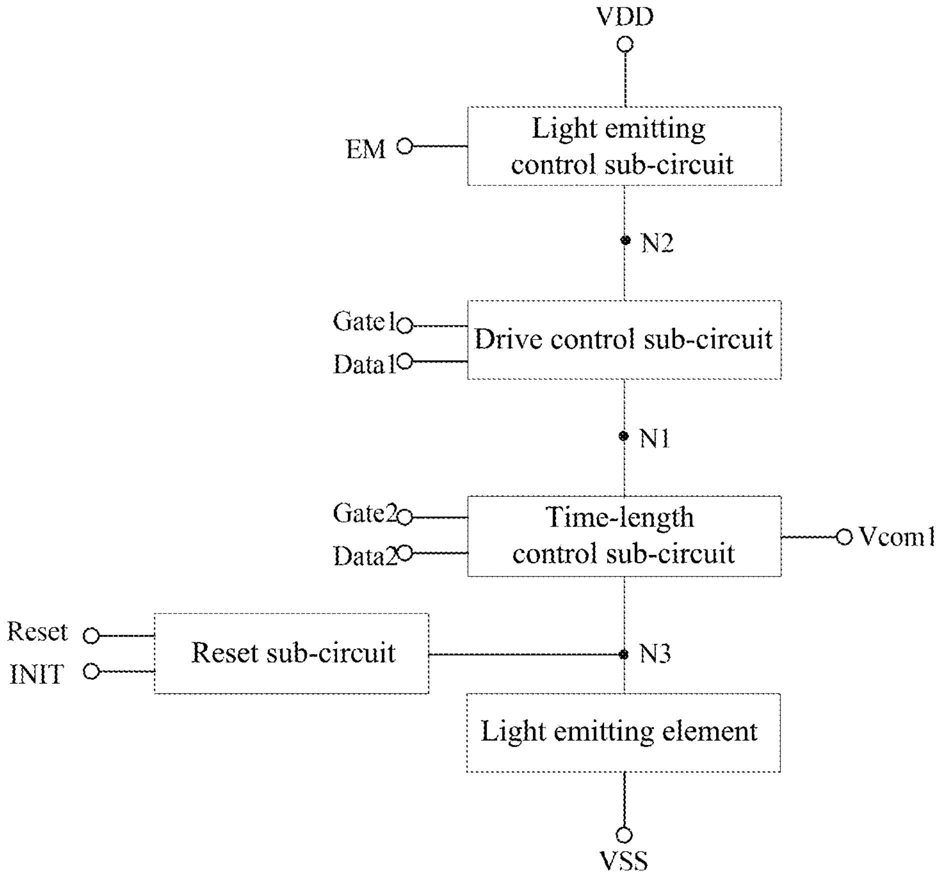
FIG. 3 is a schematic diagram of a structure of a pixel circuit according to another exemplary embodiment.
Figure 4:
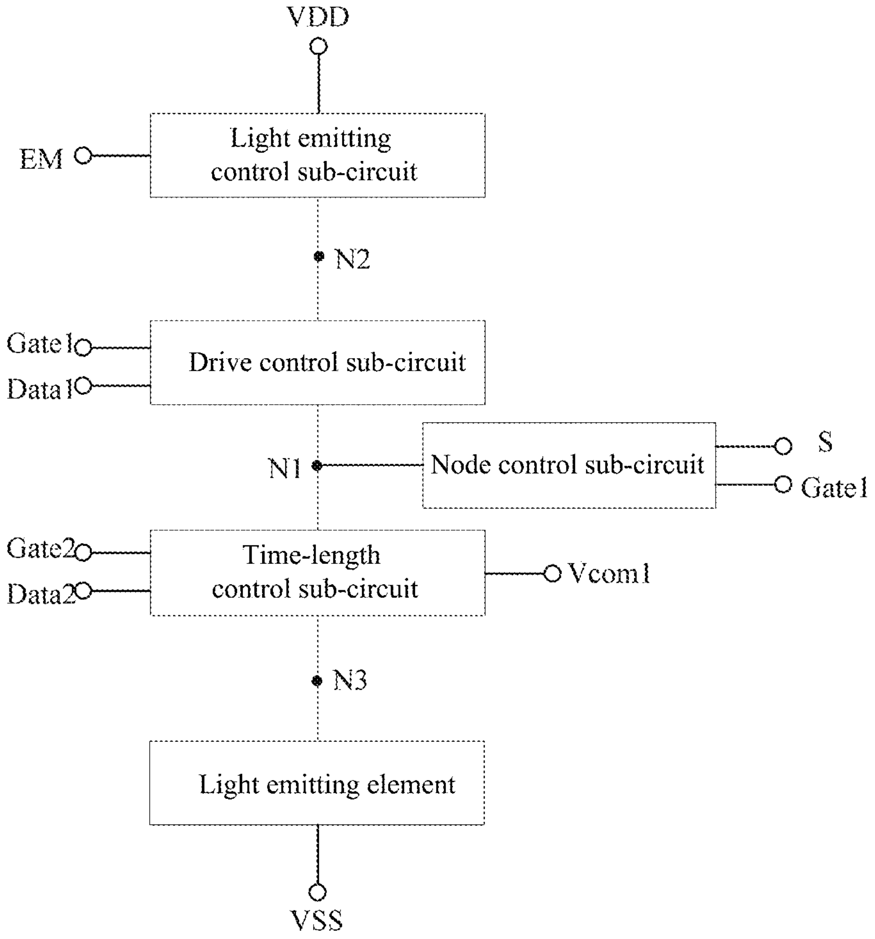
FIG. 4 is a schematic diagram of a structure of a pixel circuit according to another exemplary embodiment.
Figure 5:
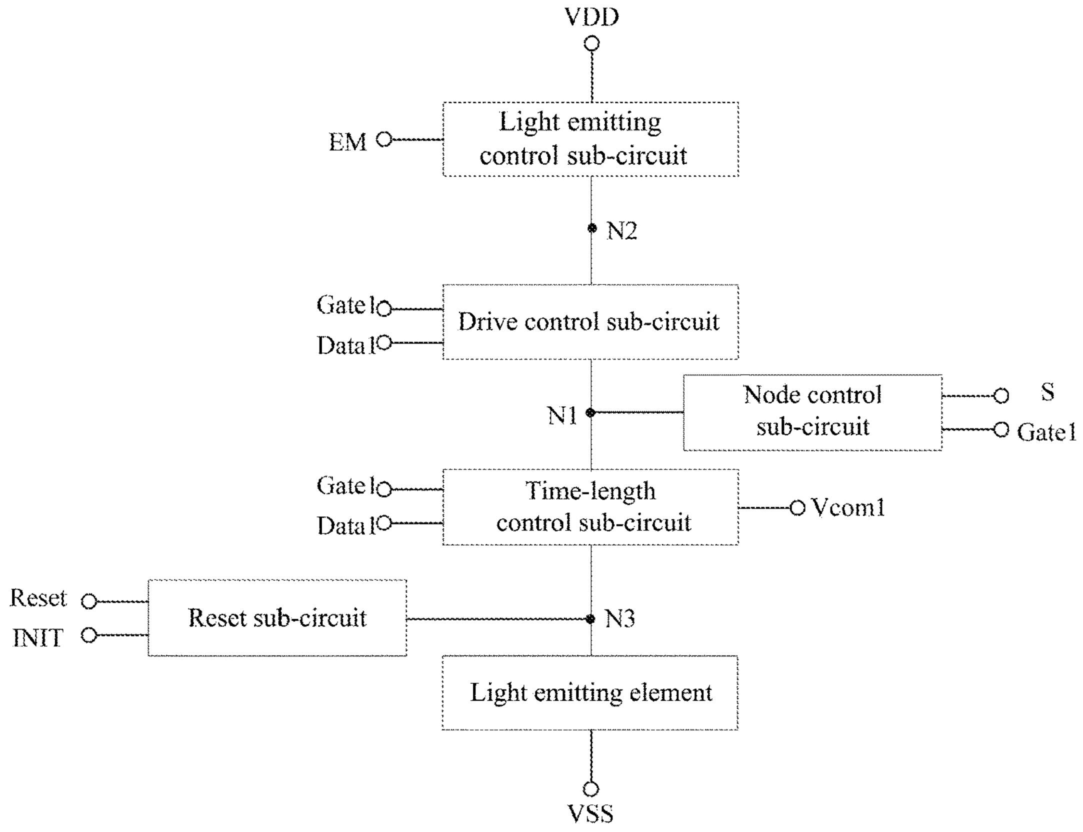
FIG. 5 is a schematic diagram of a structure of a pixel circuit according to another exemplary embodiment.

FIG. 3 is a schematic diagram of a structure of a pixel circuit according to another exemplary embodiment, FIG. 4 is a schematic diagram of a structure of a pixel circuit according to another exemplary embodiment, and FIG. 5 is a schematic diagram of a structure of a pixel circuit according to another exemplary embodiment. As shown in FIGS. 3 to 5, in an exemplary embodiment, the pixel circuit may further include a reset sub-circuit and/or a node control sub-circuit. FIG. 3 is illustrated by taking a case that the pixel circuit further includes a reset sub-circuit as an example, FIG. 4 is illustrated by taking a case that the pixel circuit further includes a node control sub-circuit as an example, and FIG. 5 is illustrated by taking a case that the pixel circuit further includes a reset sub-circuit and a node control sub-circuit as an example. FIGS. 3 to 5 are all illustrated by taking a case that the drive control sub-circuit is respectively electrically connected with a first scan signal terminal Gate1, a first data signal terminal Data1, a first node N1, and a second node N2 as an example. The drive control sub-circuit can also be electrically connected with a third scan signal terminal Gate3.

As shown in FIGS. 3 and 5, the reset sub-circuit is electrically connected with the reset signal terminal Reset, the initial signal terminal INIT and the third node N3 respectively, and is configured to provide a signal of the initial signal terminal INIT to the third node N3 under control of the reset signal terminal Reset.

In the present disclosure, by providing the reset sub-circuit, the uniformity of light emitting of the light emitting element can be ensured and the display effect of the display product can be improved.

As shown in FIGS. 4 and 5, the node control sub-circuit is electrically connected with the first scan signal terminal Gate1, a control signal terminal S and the first node N1 respectively, and is configured to provide a signal of the control signal terminal S to the first node N1 or read a signal of the first node N1 to the control signal terminal S under control of the first scan signal terminal Gate1.

In an exemplary embodiment, a voltage value of the signal of the control signal terminal S is constant, and the voltage value of the signal of the control signal terminal S may be 0V.

In the present disclosure, by providing the node control sub-circuit, the first node can be reset in a display stage, and the signal of the first node N1 in a non-display stage can also be obtained, so as to externally compensate the signal of the first data signal terminal Data1 in the display stage and improve the display effect of the display product.

In an exemplary embodiment, when a signal of the reset signal terminal Reset is an effective level signal, signals of the first scan signal terminal Gate1, the second scan signal terminal Gate2 and the light emitting signal terminal EM are ineffective level signals. When the signal of the first scan signal terminal Gate1 is an effective level signal, the signal of the reset signal terminal Reset is an ineffective level signal. When the signal of the light emitting signal terminal EM is an effective level signal, the signal of the reset signal terminal Reset is an ineffective level signal.

In an exemplary embodiment, a display sub-frame may further include a reset stage when the pixel circuit includes a reset sub-circuit. The reset stage occurs before the light emitting data writing stage. Herein, in the reset stage, the signal of the reset signal terminal Reset is an effective level signal, and the signals of the first scan signal terminal Gate1, the second scan signal terminal Gate2 and the light emitting signal terminal EM are ineffective level signals, in the light emitting data writing stage and the light emitting stage, the signal of the reset signal terminal Reset is an ineffective level signal.

In an exemplary embodiment, the drive control sub-circuit may also be electrically connected with a fourth power supply terminal. The third power supply terminal and the fourth power supply terminal may be the same power supply terminal or may be different power supply terminals, which is not limited in the present disclosure.

Figure 6A:
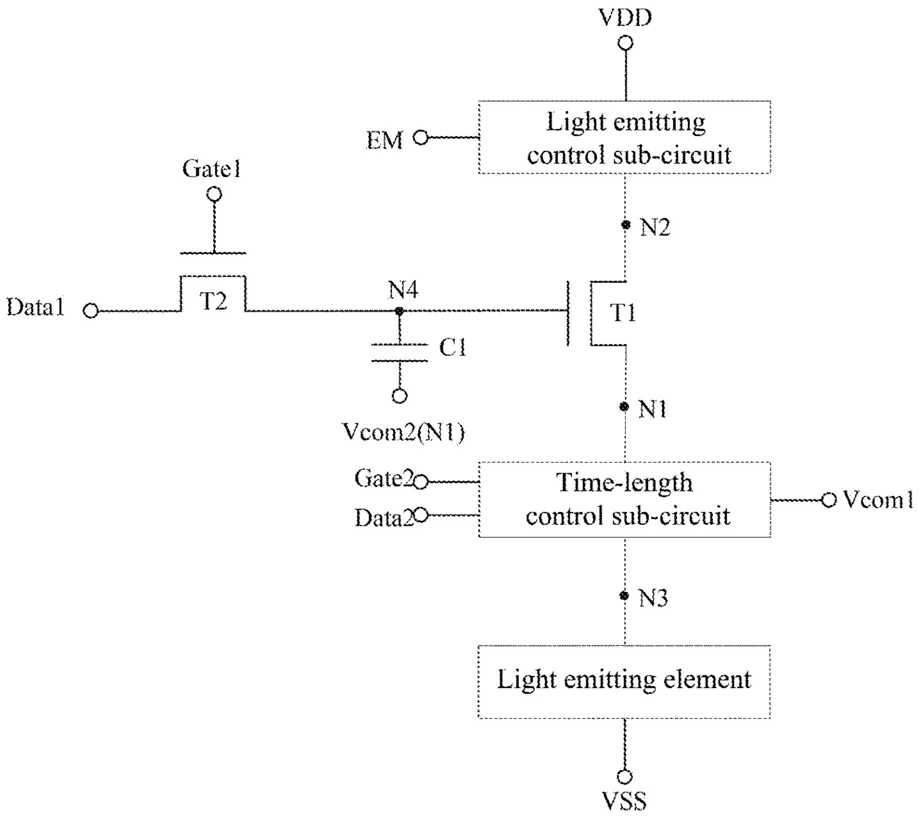
FIG. 6A is an equivalent circuit diagram of a drive control sub-circuit according to an exemplary embodiment.

FIG. 6A is an equivalent circuit diagram of a drive control sub-circuit according to an exemplary embodiment. As shown in FIG. 6A, in an exemplary embodiment, the drive control sub-circuit may include a first transistor T1, a second transistor T2, and a first capacitor C1. A control electrode of the first transistor T1 is electrically connected with the fourth node N4, a first electrode of the first transistor T1 is electrically connected with the second node N2, and a second electrode of the first transistor T1 is electrically connected with the first node N1. A control electrode of the second transistor T2 is electrically connected with the first scan signal terminal Gate1, a first electrode of the second transistor T2 is electrically connected with the first data signal terminal Data1, and a second electrode of the second transistor T2 is electrically connected with the fourth node N4. One plate of the first capacitor C1 is electrically connected with the fourth node N4, and the other plate of the first capacitor C1 is electrically connected with the fourth power supply terminal Vcom2 or the first node N1.

Figure 6B:
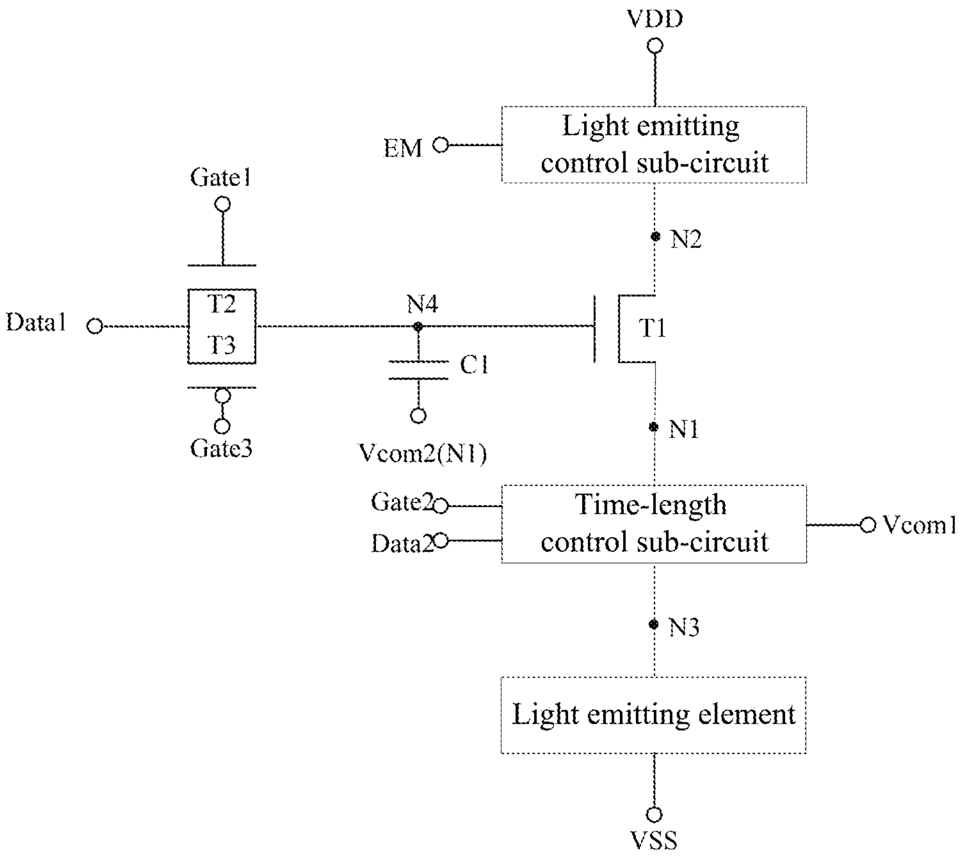
FIG. 6B is an equivalent circuit diagram of a drive control sub-circuit according to another exemplary embodiment.

FIG. 6B is an equivalent circuit diagram of a drive control sub-circuit according to another exemplary embodiment. As shown in FIG. 6B, in an exemplary embodiment, the drive control sub-circuit may include a first transistor T1, a second transistor T2, a third transistor T3, and a first capacitor C1. A control electrode of the first transistor T1 is electrically connected with the fourth node N4, a first electrode of the first transistor T1 is electrically connected with the second node N2, and a second electrode of the first transistor T1 is electrically connected with the first node N1. A control electrode of the second transistor T2 is electrically connected with the first scan signal terminal Gate1, a first electrode of the second transistor T2 is electrically connected with the first data signal terminal Data1, and a second electrode of the second transistor T2 is electrically connected with the fourth node N4. A control electrode of the third transistor T3 is electrically connected with the third scan signal terminal Gate3, a first electrode of the third transistor T3 is electrically connected with the first data signal terminal Data1, and a second electrode of the third transistor T3 is electrically connected with the fourth node N4. One plate of the first capacitor C1 is electrically connected with the fourth node N4, and the other plate of the first capacitor C1 is electrically connected with the fourth power supply terminal Vcom2 or the first node N1.

In an exemplary embodiment, transistor types of the second transistor T2 and the third transistor T3 are different.

In the present disclosure, the second transistor T2 and the third transistor T3 correspond to transmission gates, which can increase a writing range of the data signal of the first data signal terminal Data1 and improve the reliability of the pixel circuit.

Two exemplary configurations of the drive control sub-circuit are shown in FIGS. 6A and 6B. It will be readily understood by those skilled in the art that implementation modes of the drive control sub-circuit are not limited thereto.

Figure 7:
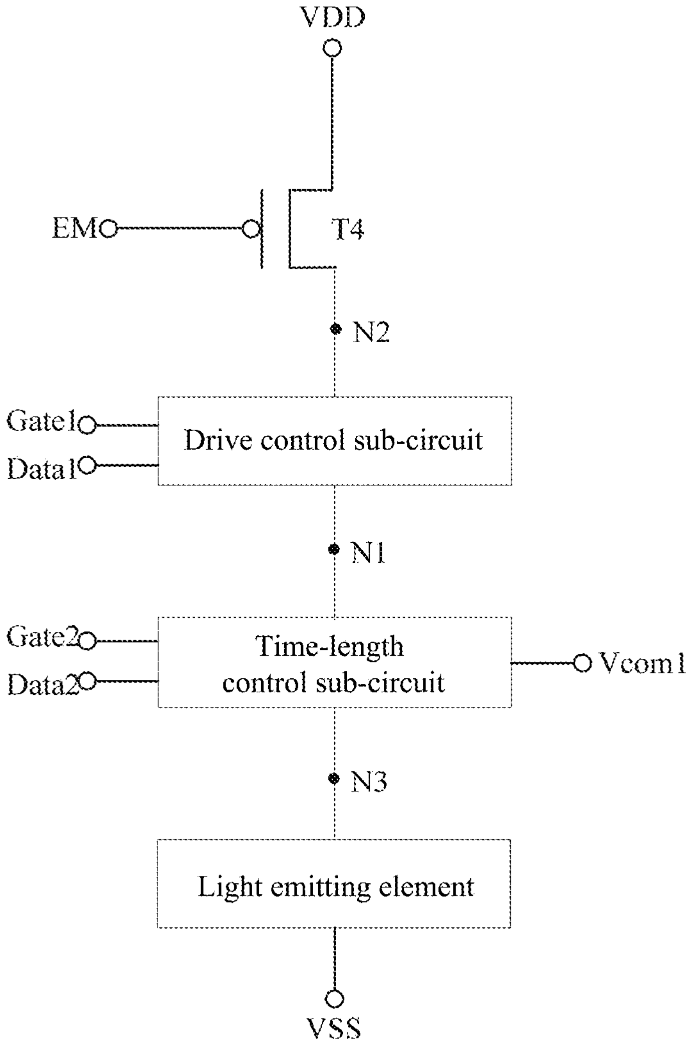
FIG. 7 is an equivalent circuit diagram of a light emitting control sub-circuit according to an exemplary embodiment.

FIG. 7 is a diagram of an equivalent circuit of a light emitting control sub-circuit according to an exemplary embodiment. As shown in FIG. 7, in an exemplary embodiment, the light emitting control sub-circuit may include a fourth transistor T4. A control electrode of the fourth transistor T4 is electrically connected with the light emitting signal terminal EM, a first electrode of the fourth transistor T4 is electrically connected with the first power supply terminal VDD, and a second electrode of the fourth transistor T4 is electrically connected with the second node N2.

FIG. 7 is illustrated by taking a case that a drive control sub-circuit is respectively electrically connected with the first scan signal terminal Gate1, the first data signal terminal Data1, the first node N1, and the second node N2 as an example. The drive control sub-circuit may also be electrically connected with the third scan signal terminal Gate3 and/or the fourth power supply terminal Vcom2.

An exemplary structure of the light emitting control sub-circuit is shown in FIG. 7. It will be readily understood by those skilled in the art that implementation modes of the light emitting control sub-circuit are not limited thereto.

Figure 8:
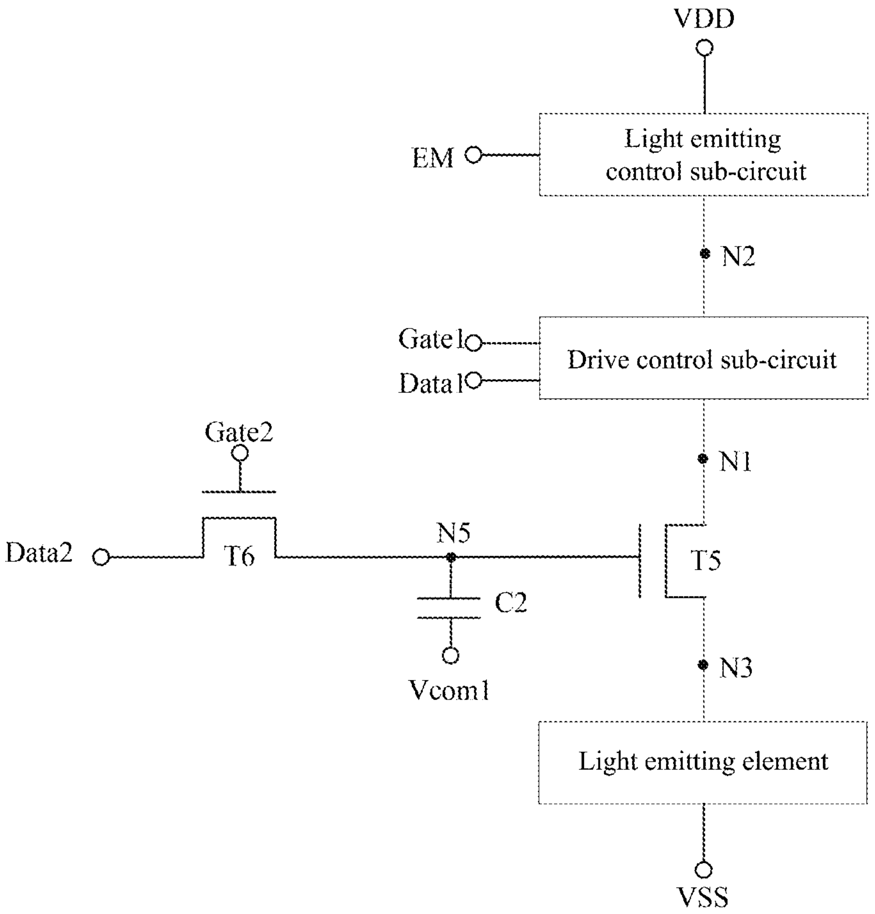
FIG. 8 is an equivalent circuit diagram of a time-length control sub-circuit according to an exemplary embodiment.

FIG. 8 is an equivalent circuit diagram of a time-length control sub-circuit according to an exemplary embodiment. As shown in FIG. 8, in an exemplary embodiment, the time-length control sub-circuit may include a fifth transistor T5, a sixth transistor T6, and a second capacitor C2. A control electrode of the fifth transistor T5 is electrically connected with a fifth node N5, a first electrode of the fifth transistor T5 is electrically connected with the first node N1, and a second electrode of the fifth transistor T5 is electrically connected with the third node N3. A control electrode of the sixth transistor T6 is electrically connected with the second scan signal terminal Gate2, a first electrode of the sixth transistor T6 is electrically connected with the second data signal terminal Data2, and a second electrode of the sixth transistor T6 is electrically connected with the fifth node N5. One plate of the second capacitor C2 is electrically connected with the fifth node N5, and the other plate of the second capacitor C2 is electrically connected with the second power supply terminal Vcom1.

FIG. 8 is illustrated by taking a case that a drive control sub-circuit is respectively electrically connected with the first scan signal terminal Gate1, the first data signal terminal Data1, the first node N1, and the second node N2 as an example. The drive control sub-circuit may also be electrically connected with the third scan signal terminal Gate3 and/or the fourth power supply terminal Vcom2.

An exemplary structure of the time-length control sub-circuit is shown in FIG. 8. It will be readily understood by those skilled in the art that implementation modes of the time-length control sub-circuit is not limited thereto.

Figure 9:
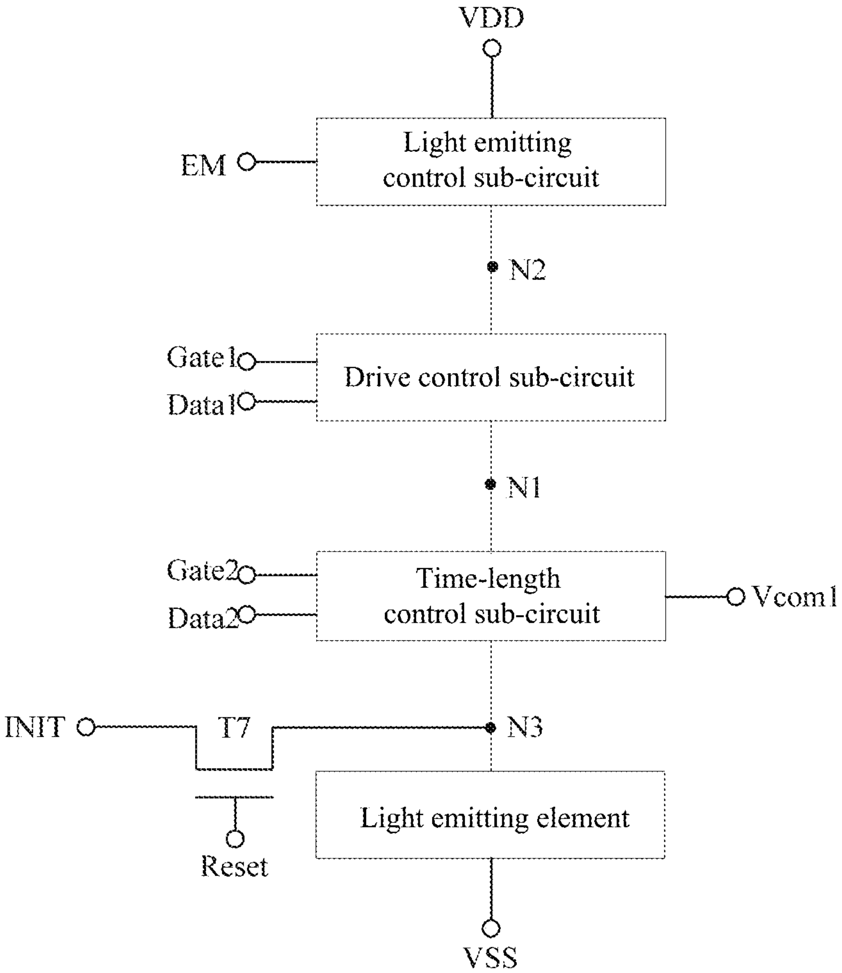
FIG. 9 is an equivalent circuit diagram of a reset sub-circuit according to an exemplary embodiment.

FIG. 9 is an equivalent circuit diagram of a reset sub-circuit according to an exemplary embodiment. As shown in FIG. 9, in an exemplary embodiment, the reset sub-circuit may include a seventh transistor T7. A control electrode of the seventh transistor T7 is electrically connected with the reset signal terminal Reset, a first electrode of the seventh transistor T7 is electrically connected with the initial signal terminal INIT, and a second electrode of the seventh transistor T7 is electrically connected with the third node N3.

FIG. 9 is illustrated by taking a case that a drive control sub-circuit is respectively electrically connected with the first scan signal terminal Gate1, the first data signal terminal Data1, the first node N1, and the second node N2 as an example. The drive control sub-circuit may also be electrically connected with the third scan signal terminal Gate3 and/or the fourth power supply terminal Vcom2.

An exemplary structure of the reset sub-circuit is shown in FIG. 9. It will be readily understood by those skilled in the art that implementation modes of the reset sub-circuit are not limited thereto.

Figure 10:
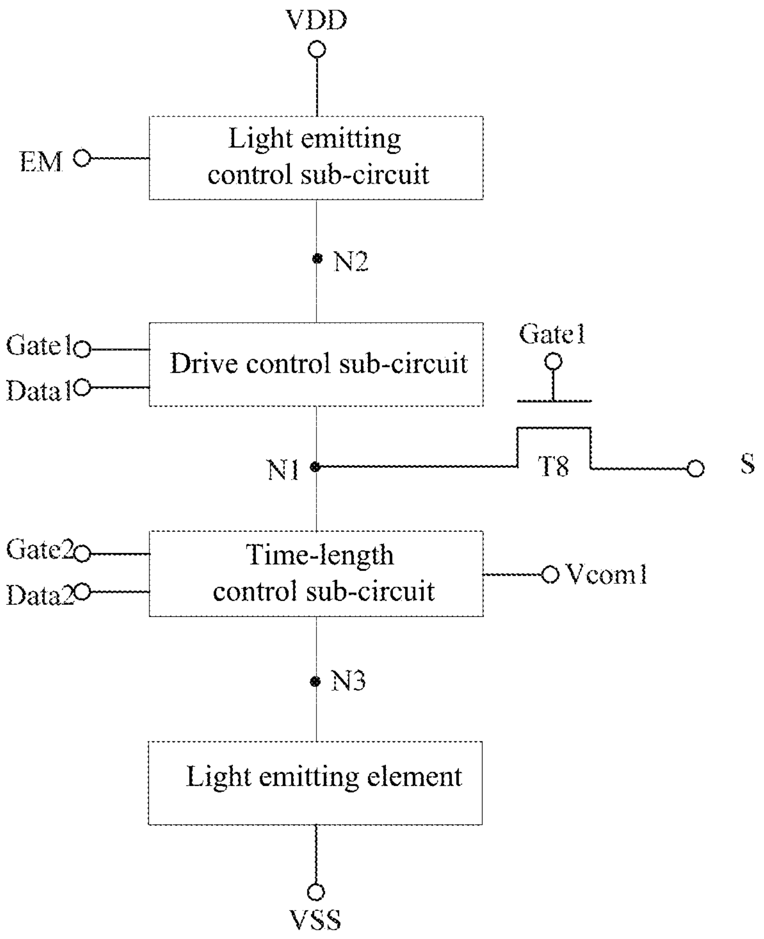
FIG. 10 is an equivalent circuit diagram of a node control sub-circuit according to an exemplary embodiment.

FIG. 10 is an equivalent circuit diagram of a node control sub-circuit according to an exemplary embodiment. As shown in FIG. 10, in an exemplary embodiment, the node control sub-circuit may include an eighth transistor T8. A control electrode of the eighth transistor T8 is electrically connected with the first scan signal terminal Gate1, a first electrode of the eighth transistor T8 is electrically connected with the control signal terminal S, and a second electrode of the eighth transistor T8 is electrically connected with the first node N1.

FIG. 10 is illustrated by taking a case that a drive control sub-circuit is respectively electrically connected with the first scan signal terminal Gate1, the first data signal terminal Data1, the first node N1, and the second node N2 as an example. The drive control sub-circuit can also be electrically connected with the third scan signal terminal Gate3.

An exemplary structure of the node control sub-circuit is shown in FIG. 10. It will be readily understood by those skilled in the art that implementation modes of the node control sub-circuit is not limited thereto.

Figure 11:
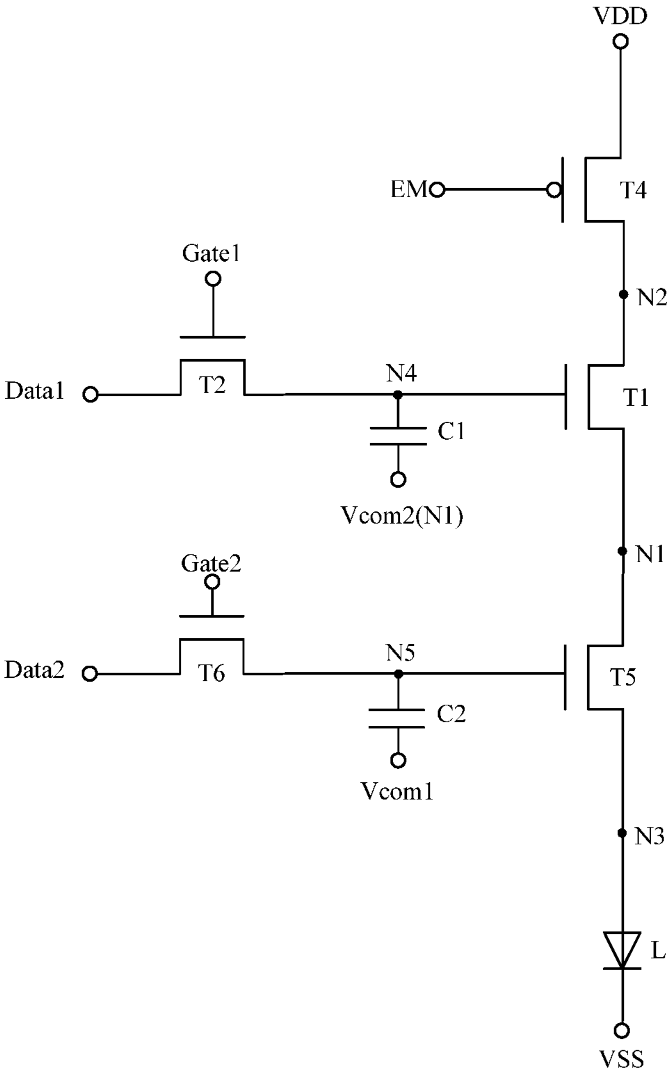
FIG. 11 is a first equivalent circuit diagram of a pixel circuit according to an exemplary embodiment.

FIG. 11 is a first equivalent circuit diagram of a pixel circuit according to an exemplary embodiment. As shown in FIG. 11, in an exemplary embodiment, a drive control sub-circuit may include a first transistor T1, a second transistor T2, and a first capacitor C1, a light emitting control sub-circuit may include a fourth transistor T4, and a time-length control sub-circuit may include a fifth transistor T5, a sixth transistor T6, and a second capacitor C2.

As shown in FIG. 11, a control electrode of the first transistor T1 is electrically connected with the fourth node N4, a first electrode of the first transistor T1 is electrically connected with the second node N2, and a second electrode of the first transistor T1 is electrically connected with the first node N1. A control electrode of the second transistor T2 is electrically connected with the first scan signal terminal Gate1, a first electrode of the second transistor T2 is electrically connected with the first data signal terminal Data1, and a second electrode of the second transistor T2 is electrically connected with the fourth node N4. A control electrode of the fourth transistor T4 is electrically connected with the light emitting signal terminal EM, a first electrode of the fourth transistor T4 is electrically connected with the first power supply terminal VDD, and a second electrode of the fourth transistor T4 is electrically connected with the second node N2. A control electrode of the fifth transistor T5 is electrically connected with the fifth node N5, a first electrode of the fifth transistor T5 is electrically connected with the first node N1, and a second electrode of the fifth transistor T5 is electrically connected with the third node N3. A control electrode of the sixth transistor T6 is electrically connected with the second scan signal terminal Gate2, a first electrode of the sixth transistor T6 is electrically connected with the second data signal terminal Data2, and a second electrode of the sixth transistor T6 is electrically connected with the fifth node N5. One plate of the first capacitor C1 is electrically connected with the fourth node N4, and the other plate of the first capacitor C1 is electrically connected with the fourth power supply terminal Vcom2 or the first node N1. One plate of the second capacitor C2 is electrically connected with the fifth node N5, and the other plate of the second capacitor C2 is electrically connected with the second power supply terminal Vcom1.

In an exemplary embodiment, transistor types of the first transistor T1, the second transistor T2, the fourth transistor T4 to the sixth transistor T6 may be the same or may be different, which are not limited in the present disclosure. FIG. 11 is illustrated by taking a case that the first transistor T1, the second transistor T2, the fifth transistor T5, and the sixth transistor T6 are N-type transistors, and the fourth transistor T4 is a P-type transistor as an example.

In an exemplary embodiment, the first transistor T1, the second transistor T2, the fourth transistor T4 to the sixth transistor T6 are all metal oxide semiconductor transistors. The metal oxide semiconductor transistors can reduce leakage current, improve performance of the pixel circuit, and reduce power consumption of the pixel circuit.

Figure 12:
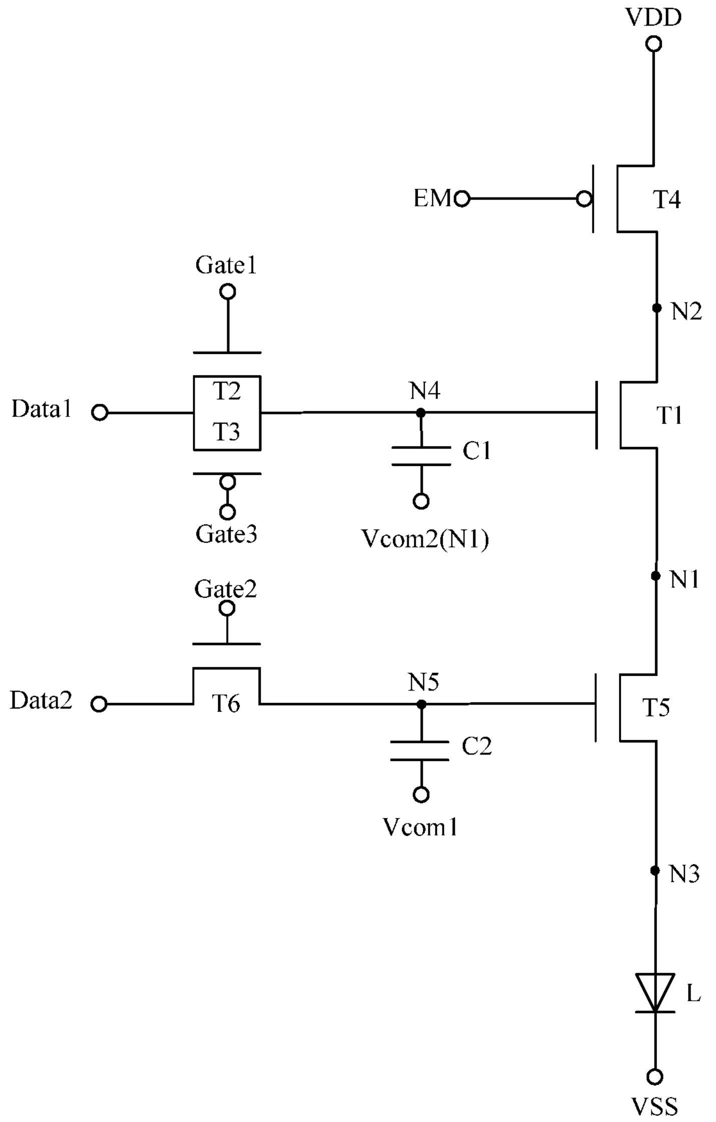
FIG. 12 is a second equivalent circuit diagram of a pixel circuit according to an exemplary embodiment.

FIG. 12 is a second equivalent circuit diagram of a pixel circuit according to an exemplary embodiment. As shown in FIG. 12, in an exemplary embodiment, a drive control sub-circuit may include a first transistor T1, a second transistor T2, a third transistor T3, and a first capacitor C1, a light emitting control sub-circuit may include a fourth transistor T4, a time-length control sub-circuit may include a fifth transistor T5, a sixth transistor T6, and a second capacitor C2.

As shown in FIG. 12, a control electrode of the first transistor T1 is electrically connected with the fourth node N4, a first electrode of the first transistor T1 is electrically connected with the second node N2, and a second electrode of the first transistor T1 is electrically connected with the first node N1. A control electrode of the second transistor T2 is electrically connected with the first scan signal terminal Gate1, a first electrode of the second transistor T2 is electrically connected with the first data signal terminal Data1, and a second electrode of the second transistor T2 is electrically connected with the fourth node N4. A control electrode of the third transistor T3 is electrically connected with the third scan signal terminal Gate3, a first electrode of the third transistor T3 is electrically connected with the first data signal terminal Data1, and a second electrode of the third transistor T3 is electrically connected with the fourth node N4. A control electrode of the fourth transistor T4 is electrically connected with the light emitting signal terminal EM, a first electrode of the fourth transistor T4 is electrically connected with the first power supply terminal VDD, and a second electrode of the fourth transistor T4 is electrically connected with the second node N2. A control electrode of the fifth transistor T5 is electrically connected with the fifth node N5, a first electrode of the fifth transistor T5 is electrically connected with the first node N1, and a second electrode of the fifth transistor T5 is electrically connected with the third node N3. A control electrode of the sixth transistor T6 is electrically connected with the second scan signal terminal Gate2, a first electrode of the sixth transistor T6 is electrically connected with the second data signal terminal Data2, and a second electrode of the sixth transistor T6 is electrically connected with the fifth node N5. One plate of the first capacitor C1 is electrically connected with the fourth node N4, and the other plate of the first capacitor C1 is electrically connected with the fourth power supply terminal Vcom2 or the first node N1. One plate of the second capacitor C2 is electrically connected with the fifth node N5, and the other plate of the second capacitor C2 is electrically connected with the second power supply terminal Vcom1.

In an exemplary embodiment, the second transistor T2 and the third transistor T3 are of opposite transistor types.

In an exemplary embodiment, transistor types of the first transistor T1, the second transistor T2, the fourth transistor T4 to the sixth transistor T6 may be the same or may be different, which are not limited in the present disclosure. FIG. 12 is illustrated by taking a case that the first transistor T1, the second transistor T2, the fifth transistor T5 and the sixth transistor T6 are N-type transistors, and the third transistor T3 and the fourth transistor T4 are P-type transistors as an example.

In an exemplary embodiment, the first transistor T1 to the sixth transistor T6 are all metal oxide semiconductor transistors. The metal oxide semiconductor transistors can reduce leakage current, improve the performance of the pixel circuit, and reduce the power consumption of the pixel circuit.

Figure 13:
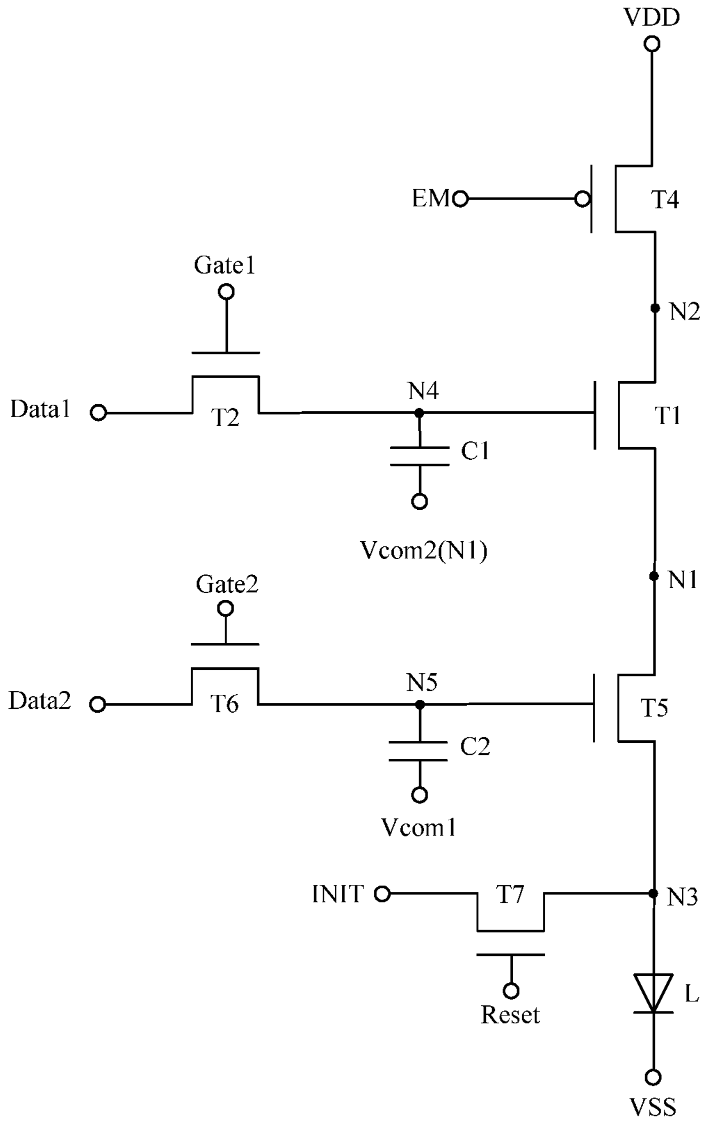
FIG. 13 is a third equivalent circuit diagram of a pixel circuit according to an exemplary embodiment.
Figure 14:
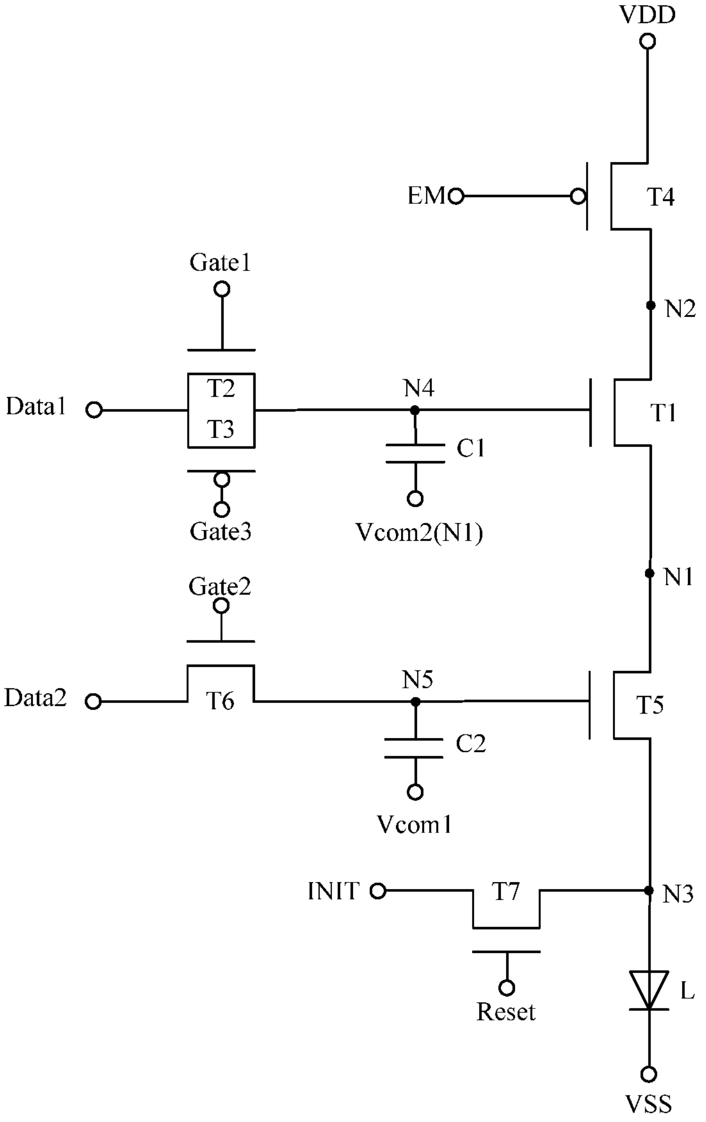
FIG. 14 is a fourth equivalent circuit diagram of a pixel circuit according to an exemplary embodiment.
Figure 15:
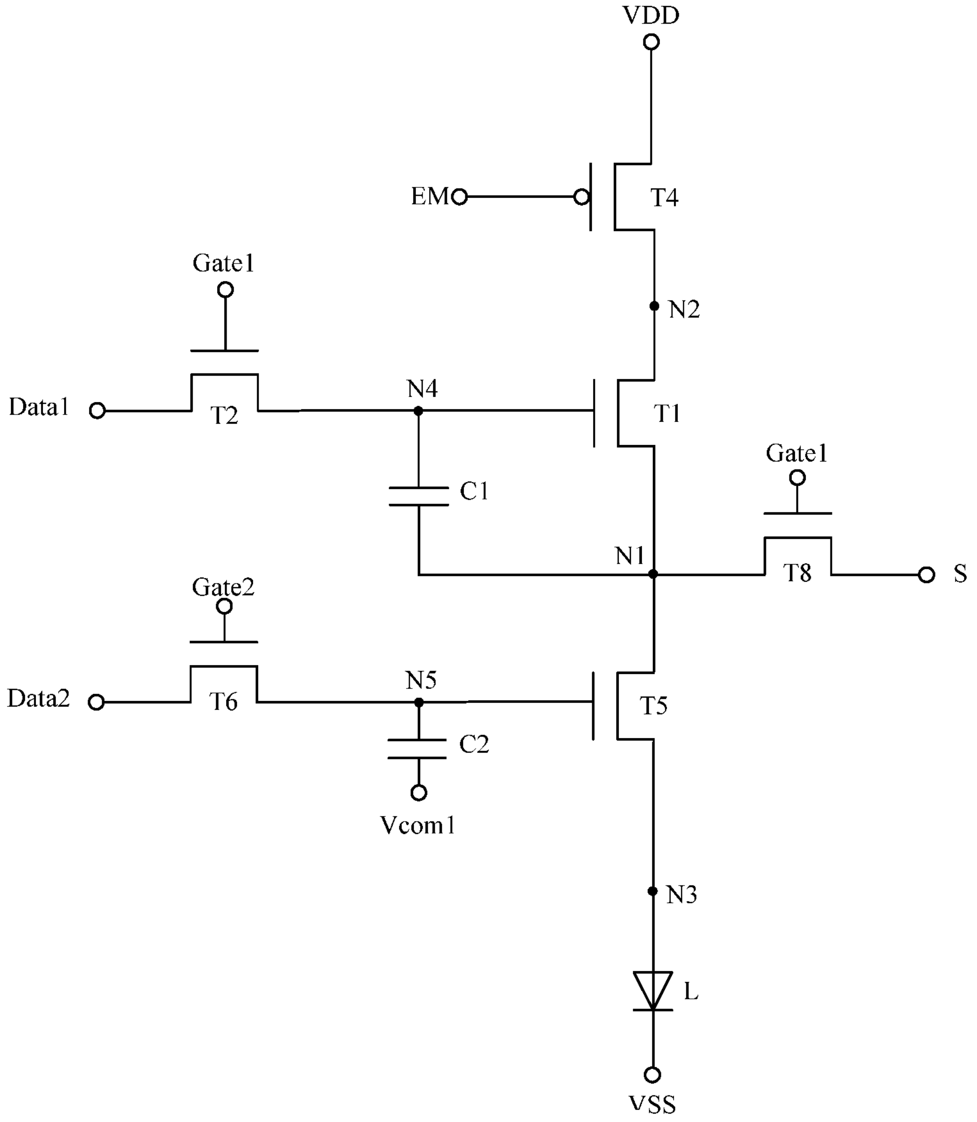
FIG. 15 is a fifth equivalent circuit diagram of a pixel circuit according to an exemplary embodiment.
Figure 16:
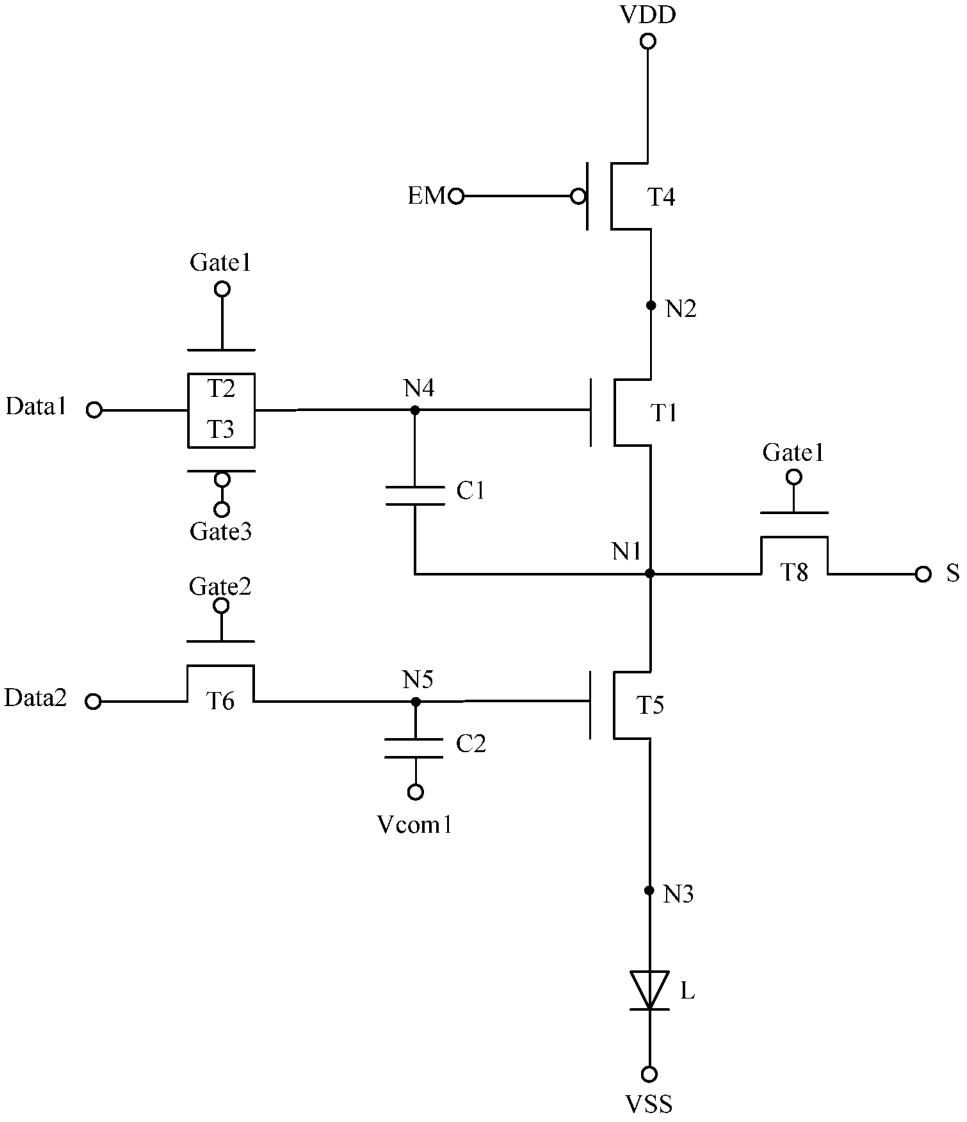
FIG. 16 is a sixth equivalent circuit diagram of a pixel circuit according to an exemplary embodiment.
Figure 17:
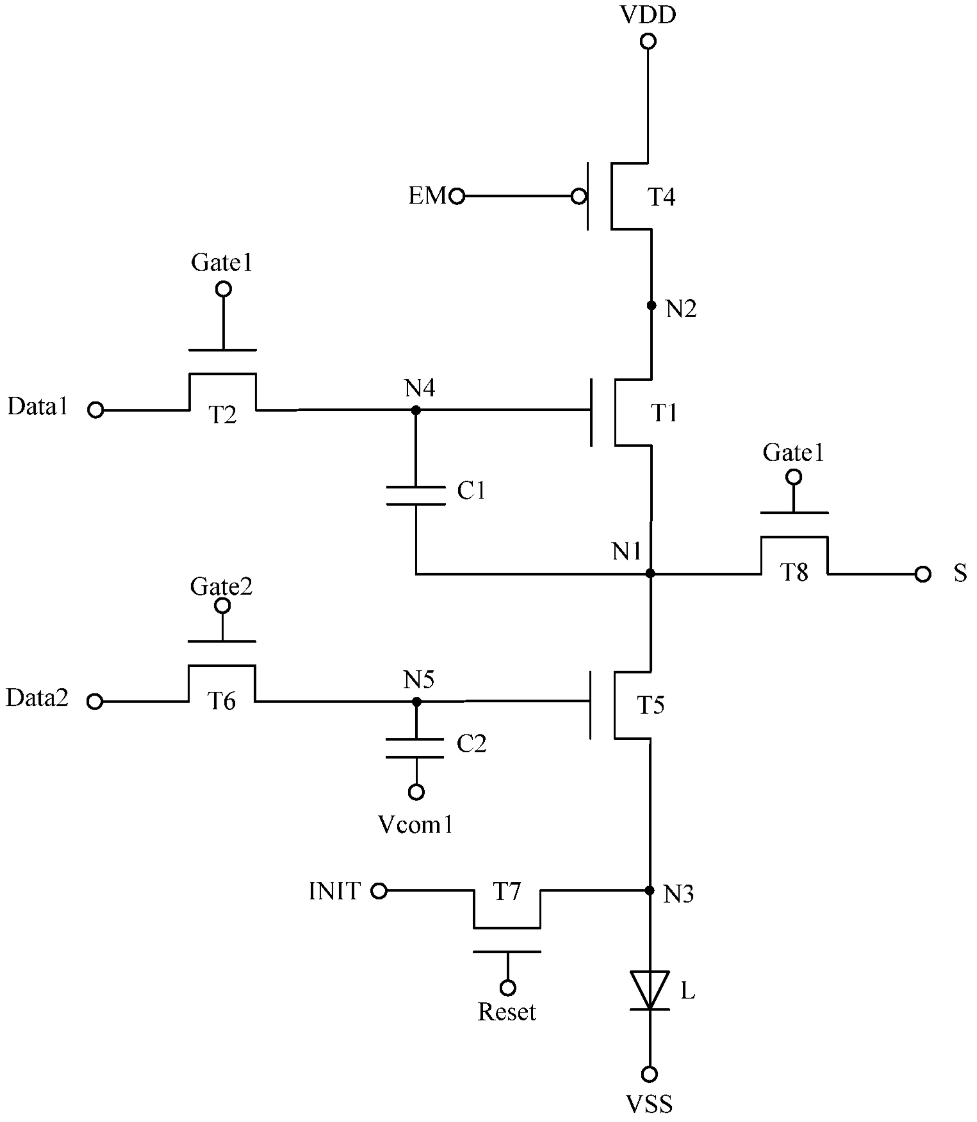
FIG. 17 is a seventh equivalent circuit diagram of a pixel circuit according to an exemplary embodiment.
Figure 18:
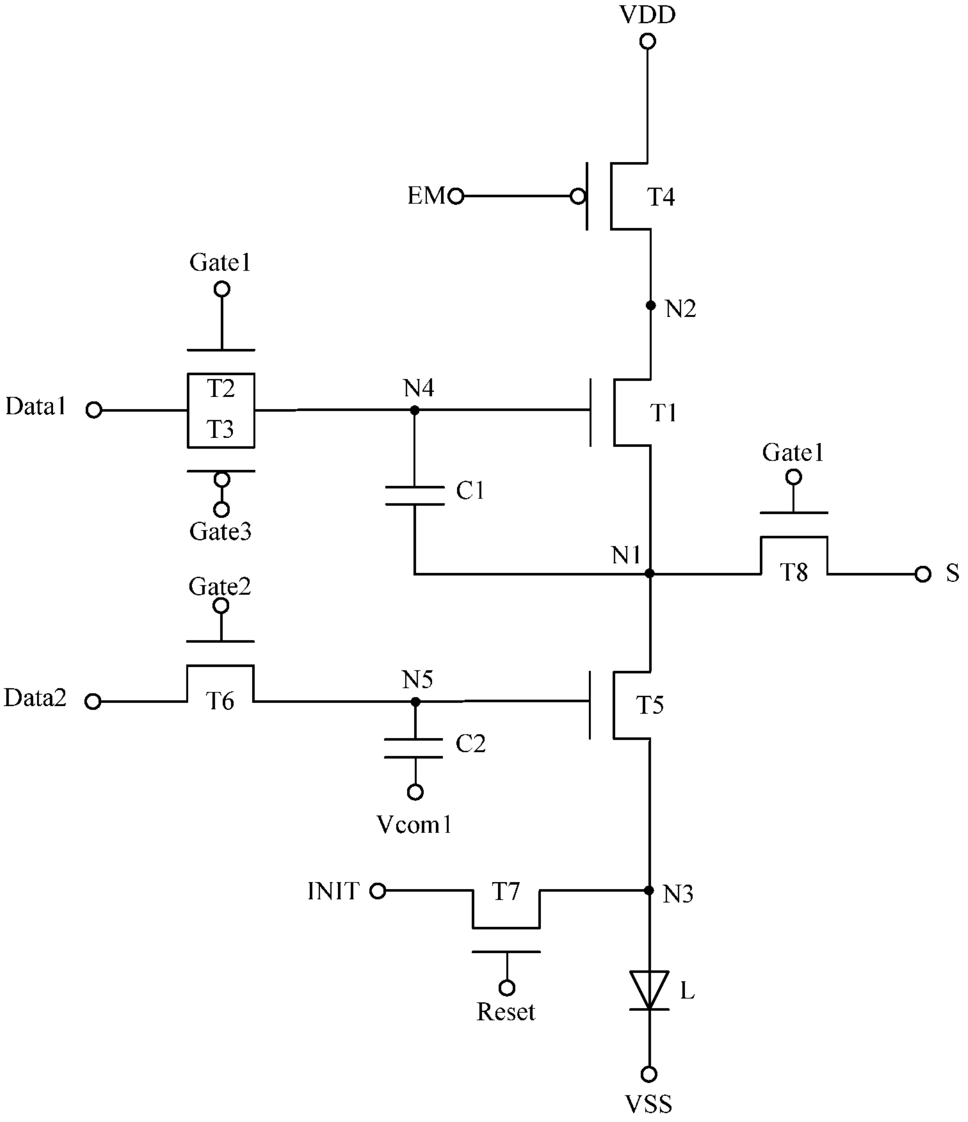
FIG. 18 is an eighth equivalent circuit diagram of a pixel circuit according to an exemplary embodiment.

FIG. 13 is a third equivalent circuit diagram of a pixel circuit according to an exemplary embodiment, FIG. 14 is a fourth equivalent circuit diagram of a pixel circuit according to an exemplary embodiment, FIG. 15 is a fifth equivalent circuit diagram of a pixel circuit according to an exemplary embodiment, FIG. 16 is a sixth equivalent circuit diagram of a pixel circuit according to an exemplary embodiment, FIG. 17 is a seventh equivalent circuit diagram of a pixel circuit according to an exemplary embodiment, and FIG. 18 is an eighth equivalent circuit diagram of a pixel circuit according to an exemplary embodiment. As shown in FIGS. 13 to 18, in an exemplary embodiment, the pixel circuit may further include a reset sub-circuit and/or a node control sub-circuit. FIGS. 13 and 14 are illustrated by taking a case that the pixel circuit includes a reset sub-circuit as an example, FIGS. 15 and 16 are illustrated by taking a case that the pixel circuit includes a node control sub-circuit as an example, and FIG. 17 and FIG. 18 are illustrated by taking a case that the pixel circuit includes a node control sub-circuit and a reset sub-circuit as an example.

As shown in FIGS. 13, 15 and 17, in an exemplary embodiment, a drive control sub-circuit may include a first transistor T1, a second transistor T2, and a first capacitor C1, a light emitting control sub-circuit may include a fourth transistor T4, a time-length control sub-circuit may include a fifth transistor T5, a sixth transistor T6, and a second capacitor C2, the reset sub-circuit may include a seventh transistor T7, and the node control sub-circuit may include an eighth transistor T8.

As shown in FIGS. 13, 15 and 17, a control electrode of the first transistor T1 is electrically connected with the fourth node N4, a first electrode of the first transistor T1 is electrically connected with the second node N2, and a second electrode of the first transistor T1 is electrically connected with the first node N1. A control electrode of the second transistor T2 is electrically connected with the first scan signal terminal Gate1, a first electrode of the second transistor T2 is electrically connected with the first data signal terminal Data1, and a second electrode of the second transistor T2 is electrically connected with the fourth node N4. A control electrode of the fourth transistor T4 is electrically connected with the light emitting signal terminal EM, a first electrode of the fourth transistor T4 is electrically connected with the first power supply terminal VDD, and a second electrode of the fourth transistor T4 is electrically connected with the second node N2. A control electrode of the fifth transistor T5 is electrically connected with the fifth node N5, a first electrode of the fifth transistor T5 is electrically connected with the first node N1, and a second electrode of the fifth transistor T5 is electrically connected with the third node N3. A control electrode of the sixth transistor T6 is electrically connected with the second scan signal terminal Gate2, a first electrode of the sixth transistor T6 is electrically connected with the second data signal terminal Data2, and a second electrode of the sixth transistor T6 is electrically connected with the fifth node N5. A control electrode of the seventh transistor T7 is electrically connected with the reset signal terminal Reset, a first electrode of the seventh transistor T7 is electrically connected with the initial signal terminal INIT, and a second electrode of the seventh transistor T7 is electrically connected with the third node N3. A control electrode of the eighth transistor T8 is electrically connected with the first scan signal terminal Gate1, a first electrode of the eighth transistor T8 is electrically connected with the control signal terminal S, and a second electrode of the eighth transistor T8 is electrically connected with the first node N1. One plate of the first capacitor C1 is electrically connected with the fourth node N4, and the other plate of the first capacitor C1 is electrically connected with the fourth power supply terminal Vcom2 or the first node N1. One plate of the second capacitor C2 is electrically connected with the fifth node N5, and the other plate of the second capacitor C2 is electrically connected with the second power supply terminal Vcom1.

In an exemplary embodiment, the other plate of the first capacitor C1 is electrically connected with the first node N1 when the pixel circuit includes a node control sub-circuit, and the other plate of the first capacitor C1 may be electrically connected with the fourth power supply terminal Vcom2 or the first node N1 when the pixel circuit does not include a node control sub-circuit.

In an exemplary embodiment, transistor types of the first transistor T1, the second transistor T2, the fourth transistor T4 to the eighth transistor T8 may be the same or may be different, which are not limited in the present disclosure. FIG. 13, FIG. 15, and FIG. 17 are illustrated by taking a case that the first transistor T1, the second transistor T2, the fifth transistor T5 to the eighth transistor T8 are N-type transistors and the fourth transistor T4 is a P-type transistor as an example.

In an exemplary embodiment, the first transistor T1, the second transistor T2, the fourth transistor T4 to the eighth transistor T8 are all metal oxide semiconductor transistors. The metal oxide semiconductor transistors can reduce leakage current, improve the performance of the pixel circuit, and reduce the power consumption of the pixel circuit.

As shown in FIGS. 14, 16 and 18, in an exemplary embodiment, a drive control sub-circuit may include a first transistor T1 to a third transistor T3 and a first capacitor C1, a light emitting control sub-circuit may include a fourth transistor T4, a time-length control sub-circuit may include a fifth transistor T5, a sixth transistor T6 and a second capacitor C2, the reset sub-circuit may include a seventh transistor T7, and the node control sub-circuit may include an eighth transistor T8.

As shown in FIGS. 14, 16 and 18, a control electrode of the first transistor T1 is electrically connected with the fourth node N4, a first electrode of the first transistor T1 is electrically connected with the second node N2, and a second electrode of the first transistor T1 is electrically connected with the first node N1. A control electrode of the second transistor T2 is electrically connected with the first scan signal terminal Gate1, a first electrode of the second transistor T2 is electrically connected with the first data signal terminal Data1, and a second electrode of the second transistor T2 is electrically connected with the fourth node N4. A control electrode of the third transistor T3 is electrically connected with the third scan signal terminal Gate3, a first electrode of the third transistor T3 is electrically connected with the first data signal terminal Data1, and a second electrode of the third transistor T3 is electrically connected with the fourth node N4. A control electrode of the fourth transistor T4 is electrically connected with the light emitting signal terminal EM, a first electrode of the fourth transistor T4 is electrically connected with the first power supply terminal VDD, and a second electrode of the fourth transistor T4 is electrically connected with the second node N2. A control electrode of the fifth transistor T5 is electrically connected with the fifth node N5, a first electrode of the fifth transistor T5 is electrically connected with the first node N1, and a second electrode of the fifth transistor T5 is electrically connected with the third node N3. A control electrode of the sixth transistor T6 is electrically connected with the second scan signal terminal Gate2, a first electrode of the sixth transistor T6 is electrically connected with the second data signal terminal Data2, and a second electrode of the sixth transistor T6 is electrically connected with the fifth node N5. A control electrode of the seventh transistor T7 is electrically connected with the reset signal terminal Reset, a first electrode of the seventh transistor T7 is electrically connected with the initial signal terminal INIT, and a second electrode of the seventh transistor T7 is electrically connected with the third node N3. A control electrode of the eighth transistor T8 is electrically connected with the first scan signal terminal Gate1, a first electrode of the eighth transistor T8 is electrically connected with the control signal terminal S, and a second electrode of the eighth transistor T8 is electrically connected with the first node N1. One plate of the first capacitor C1 is electrically connected with the fourth node N4, and the other plate of the first capacitor C1 is electrically connected with the fourth power supply terminal Vcom2 or the first node N1. One plate of the second capacitor C2 is electrically connected with the fifth node N5, and the other plate of the second capacitor C2 is electrically connected with the second power supply terminal Vcom1.

In an exemplary embodiment, the other plate of the first capacitor C1 is electrically connected with the first node N1 when the pixel circuit includes a node control sub-circuit, and the other plate of the first capacitor C1 may be electrically connected with the fourth power supply terminal Vcom2 or may be electrically connected with the first node N1 when the pixel circuit does not include a node control sub-circuit.

In an exemplary embodiment, the second transistor T2 and the third transistor T3 are of opposite transistor types.

In an exemplary embodiment, transistor types of the first transistor T1 to the eighth transistor T8 may be the same or may be different, which are not limited in the present disclosure. FIG. 14, FIG. 16, and FIG. 18 are illustrated by taking the first transistor T1, the second transistor T2, the fifth transistor T5 to the eighth transistor T8 are N-type transistors, and the third transistor T3 and the fourth transistor T4 are P-type transistors as an example.

In an exemplary embodiment, the first transistor T1 to the eighth transistor T8 are all metal oxide semiconductor transistors. The metal oxide semiconductor transistors can reduce leakage current, improve the performance of the pixel circuit, and reduce the power consumption of the pixel circuit.

In an exemplary embodiment, the first transistor T1 may be referred to as a drive transistor, and the first transistor T1 determines a drive current flowing between the second node N2 and the first node N1 according to a potential difference between the control electrode and the first electrode of the first transistor T1.

In an exemplary embodiment, the light emitting element in the present disclosure may be a silicon-based LED, i.e., the light emitting element is disposed on a silicon-based substrate.

In an exemplary embodiment, all of the transistors in the present disclosure may be disposed on a silicon-based substrate and may be metal oxide semiconductor transistors, and a breadth-length ratio of an active layer of the metal oxide semiconductor transistor is in the (sub) micron order, that is, its size is small. Therefore, the pixel circuit in the present disclosure may also be referred to as a silicon-based circuit.

Because the breadth-length ratio of the active layer of the metal oxide semiconductor transistor is in (sub) micron order, a high PPI, usually above 2000-3000 PPI, can be achieved on the display substrate where the pixel circuit is located, and consequently a "screen window effect" is avoided. Since electrical performance of a metal oxide semiconductor transistor is relatively stable, electrical performance of a silicon-based circuit is more stable, there is no need for excessive internal threshold compensation while pursuing high PPI.

Figure 19:
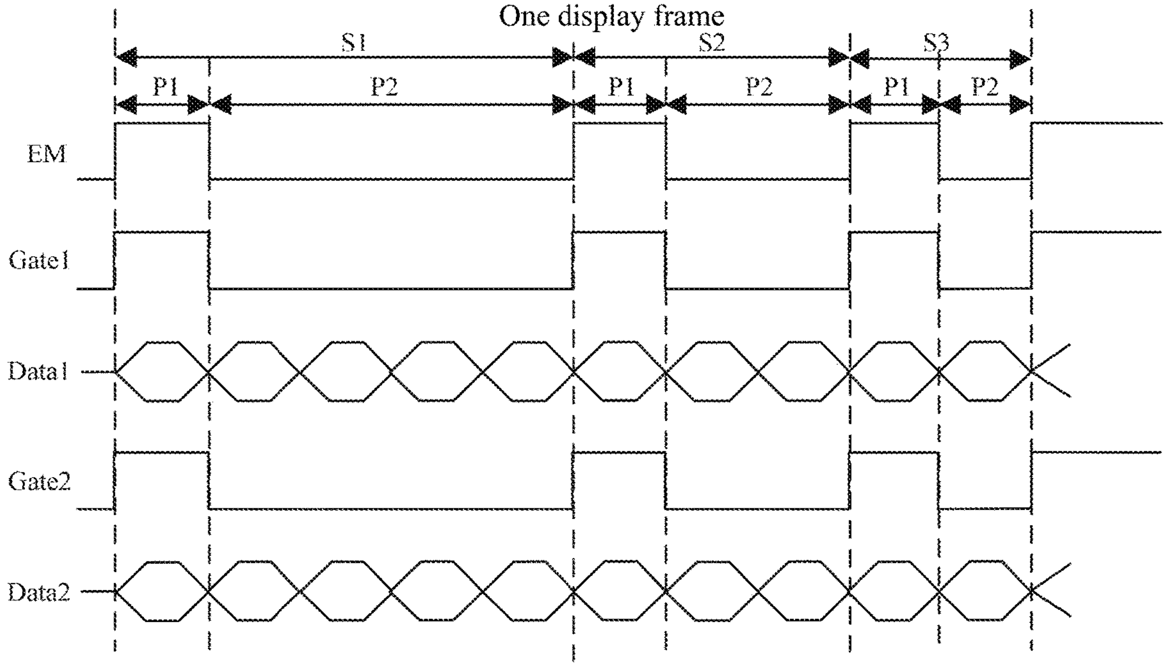
FIG. 19 is an operating timing diagram of the pixel circuit provided in FIG. 11 in a display stage.

Exemplary embodiments of the present disclosure are described below through an operation process of the pixel circuit illustrated in FIG. 11 during a display stage. FIG. 19 is an operating timing diagram of the pixel circuit provided in FIG. 11 in the display stage. FIG. 19 is illustrated by taking a case that the first transistor T1, the second transistor T2, the fifth transistor T5 to the sixth transistor T6 are N-type transistors and the fourth transistor T4 is a P-type transistor as an example. With reference to FIGS. 11 and 19, the operation process of the pixel circuit in a display sub-frame may include following stages.

In a light emitting data writing stage P1, a signal of the first scan signal terminal Gate1 is a high-level signal, the second transistor T2 is turned on, the first data signal terminal Data1 outputs a data voltage, and a signal of the first data signal terminal Data1 is written to the fourth node N4 through the turned-on second transistor T2. A signal of the second scan signal terminal Gate2 is a high-level signal, the sixth transistor T6 is turned on, the second data signal terminal Data2 outputs a data voltage, a signal of the second data signal terminal Data2 is written to the fifth node N5 through the turned-on sixth transistor T6. When the signal of the second data signal terminal Data2 is a high-level signal, the fifth transistor T5 is turned on, when the signal of the second data signal terminal Data2 is a low-level signal, the fifth transistor T5 is turned off, a signal of the light emitting signal terminal EM is a high-level signal, the fourth transistor T4 is turned off, and the light emitting element L does not emit light.

In a light emitting stage P2, the signal of the light emitting signal terminal EM is a low-level signal, the fourth transistor T4 is turned on, a high-level signal of the first power supply terminal VDD is written to the second node N2 through the turned-on fourth transistor T4. The signal of the first scan signal terminal Gate1 is a low-level signal, the second transistor T2 is turned off, the fourth node N4 maintains a signal of the previous stage, and the first transistor T1 is turned on. The signal of the second scan signal terminal Gate2 is a low-level signal, the sixth transistor T6 is turned off, the fifth node N5 maintains a signal of the previous stage, and the fifth transistor T5 is kept in the turned-on or turned-off state of the previous stage. When the fifth transistor T5 is turned on, a current path between the first power supply terminal VDD and the third power supply terminal VSS is turned on, and the light emitting element L emits light, when the fifth transistor T5 is turned off, the current path between the first power supply terminal VDD and the third power supply terminal VSS is turned off, and the light emitting element L does not emit light.

Figure 20:
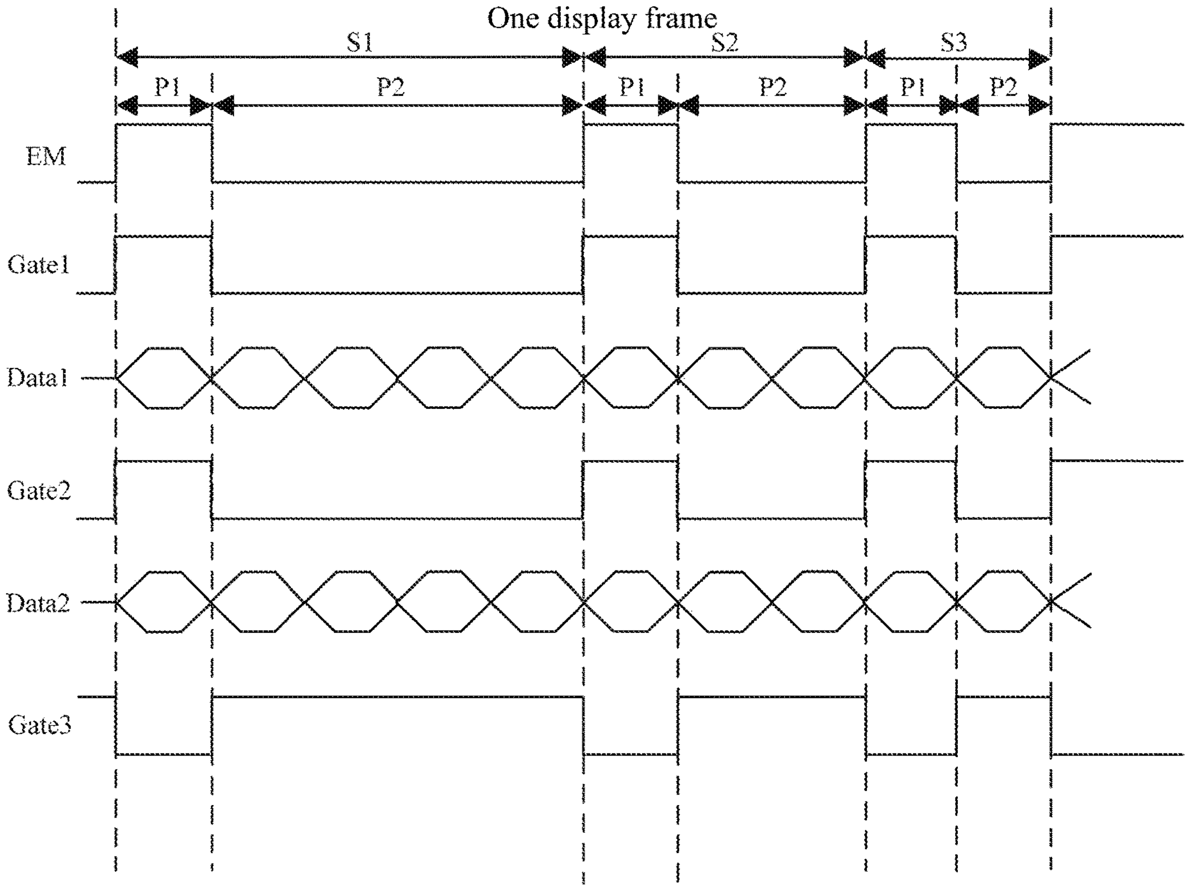
FIG. 20 is an operating timing diagram of the pixel circuit provided in FIG. 12 in a display stage.

Exemplary embodiments of the present disclosure are described below through an operation process of the pixel circuit illustrated in FIG. 12 in a display stage. FIG. 20 is an operating timing diagram of the pixel circuit provided in FIG. 12 in the display stage. FIG. 20 is illustrated by taking a case that the first transistor T1, the second transistor T2, the fifth transistor T5 to the sixth transistor T6 are N-type transistors and the third transistor T3 and the fourth transistor T4 are P-type transistors as an example. With reference to FIGS. 12 and 20, the operation process of the pixel circuit in a display sub-frame may include following stages.

In a light emitting data writing stage P1, the signal of the first scan signal terminal Gate1 is a high-level signal, the second transistor T2 is turned on, the signal of the third scan signal terminal Gate3 is a low-level signal, the third transistor T3 is turned on. The first data signal terminal Data1 outputs a data voltage, a signal of the first data signal terminal Data1 is written to the fourth node N4 through the turned-on second transistor T2 and the turned-on third transistor T3. A signal of the second scan signal terminal Gate2 is a high-level signal, the sixth transistor T6 is turned on, the second data signal terminal Data2 outputs a data voltage, a signal of the second data signal terminal Data2 is written to the fifth node N5 through the turned-on sixth transistor T6. When the signal of the second data signal terminal Data2 is a high-level signal, the fifth transistor T5 is turned on, when the signal of the second data signal terminal Data2 is a low-level signal, the fifth transistor T5 is turned off, the signal of the light emitting signal terminal EM is a high-level signal, the fourth transistor T4 is turned off, and the light emitting element L does not emit light.

In a light emitting stage P2, the signal of the light emitting signal terminal EM is a low-level signal, the fourth transistor T4 is turned on, a high-level signal of the first power supply terminal VDD is written to the second node N2 through the turned-on fourth transistor T4. The signal of the first scan signal terminal Gate1 is a low-level signal, the second transistor T2 is turned off, the signal of the third scan signal terminal Gate3 is a high-level signal, the third transistor T3 is turned off. The fourth node N4 maintains a signal of the previous stage, the first transistor T1 is turned on, the signal of the second scan signal terminal Gate2 is a low-level signal, and the sixth transistor T6 is turned off. The fifth node N5 maintains a signal of the previous stage, the fifth transistor T5 holds the turned-on or turned-off state of the previous stage. When the fifth transistor T5 is turned on, a current path between the first power supply terminal VDD and the third power supply terminal VSS is turned on, and the light emitting element L emits light. When the fifth transistor T5 is turned off, the current path between the first power supply terminal VDD and the third power supply terminal VSS is turned off, and the light emitting element L does not emit light.

Figure 21:
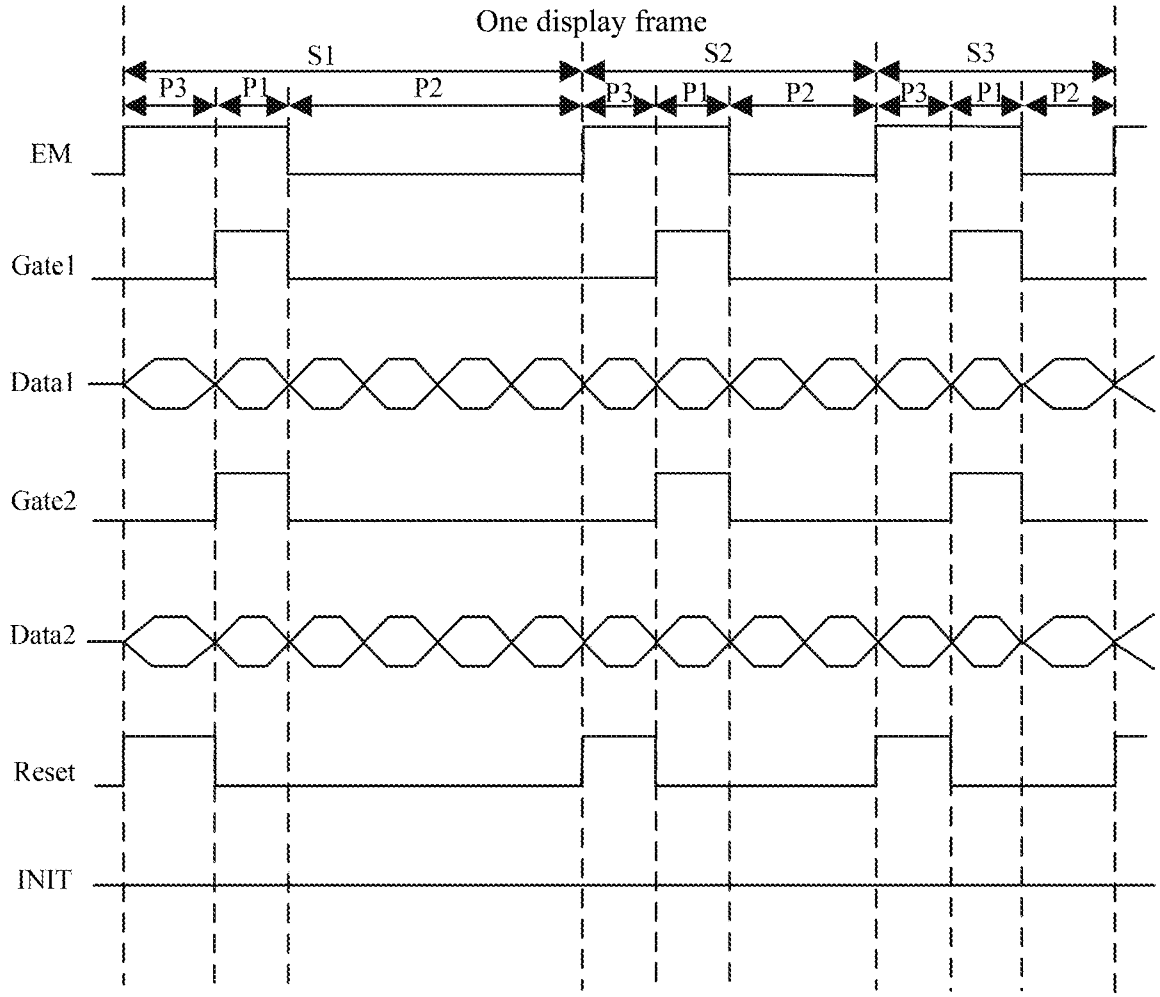
FIG. 21 is an operating timing diagram of the pixel circuit provided in FIG. 13 in a display stage.

Exemplary embodiments of the present disclosure are described below through an operation process of the pixel circuit illustrated in FIG. 13 in a display stage. FIG. 21 is an operating timing diagram of the pixel circuit provided in FIG. 13 in the display stage. FIG. 21 is illustrated by taking a case that the first transistor T1, the second transistor T2, the fifth transistor T5 to the seventh transistor T7 are N-type transistors and the fourth transistor T4 is a P-type transistor as an example. With reference to FIGS. 13 and 21, the operation process of the pixel circuit in a display sub-frame may include following stages.

In a reset stage P3, a signal of the reset signal terminal Reset is a high-level signal, the seventh transistor T7 is turned on, a signal of the initial signal terminal INIT is written to the third node N3 through the turned-on seventh transistor T7, so that a first electrode of the light emitting element is reset. A signal of the first scan signal terminal Gate1 is a low-level signal, the second transistor T2 is turned off, a signal of the second scan signal terminal Gate2 is a low-level signal, the sixth transistor T6 is turned off, a signal of the light emitting signal terminal EM is a high-level signal, the fourth transistor T4 is turned off, and the light emitting element L does not emit light.

In a light emitting data writing stage P1, the signal of the first scan signal terminal Gate1 is a high-level signal, the second transistor T2 is turned on, the first data signal terminal Data1 outputs a data voltage. A signal of the first data signal terminal Data1 is written to the fourth node N4 through the turned-on second transistor T2, the signal of the second scan signal terminal Gate2 is a high-level signal, the sixth transistor T6 is turned on. The second data signal terminal Data2 outputs a data voltage, a signal of the second data signal terminal Data2 is written to the fifth node N5 through the turned-on sixth transistor T6. When the signal of the second data signal terminal Data2 is a high-level signal, the fifth transistor T5 is turned on, when the signal of the second data signal terminal Data2 is a low-level signal, the fifth transistor T5 is turned off. The signal of the light emitting signal terminal EM is a high-level signal, the fourth transistor T4 is turned off, the signal of the reset signal terminal Reset is a low-level signal, the seventh transistor T7 is turned off, and the light emitting element L does not emit light.

In a light emitting stage P2, the signal of the light emitting signal terminal EM is a low-level signal, the fourth transistor T4 is turned on, and a high-level signal of the first power supply terminal VDD is written to the second node N2 through the turned-on fourth transistor T4. The signal of the reset signal terminal Reset is a low-level signal, the seventh transistor T7 is turned off, the signal of the first scan signal terminal Gate1 is a low-level signal, and the second transistor T2 is turned off. The fourth node N4 maintains a signal of the previous stage, the first transistor T1 is turned on, the signal of the second scan signal terminal Gate2 is a low-level signal, the sixth transistor T6 is turned off, the fifth node N5 maintains a signal of the previous stage, and the fifth transistor T5 holds the turned-on or turned-off state of the previous stage. When the fifth transistor T5 is turned on, the current path between the first power supply terminal VDD and the third power supply terminal VSS is turned on, and the light emitting element L emits light, when the fifth transistor T5 is turned off, the current path between the first power supply terminal VDD and the third power supply terminal VSS is turned off, and the light emitting element L does not emit light.

Figure 22:
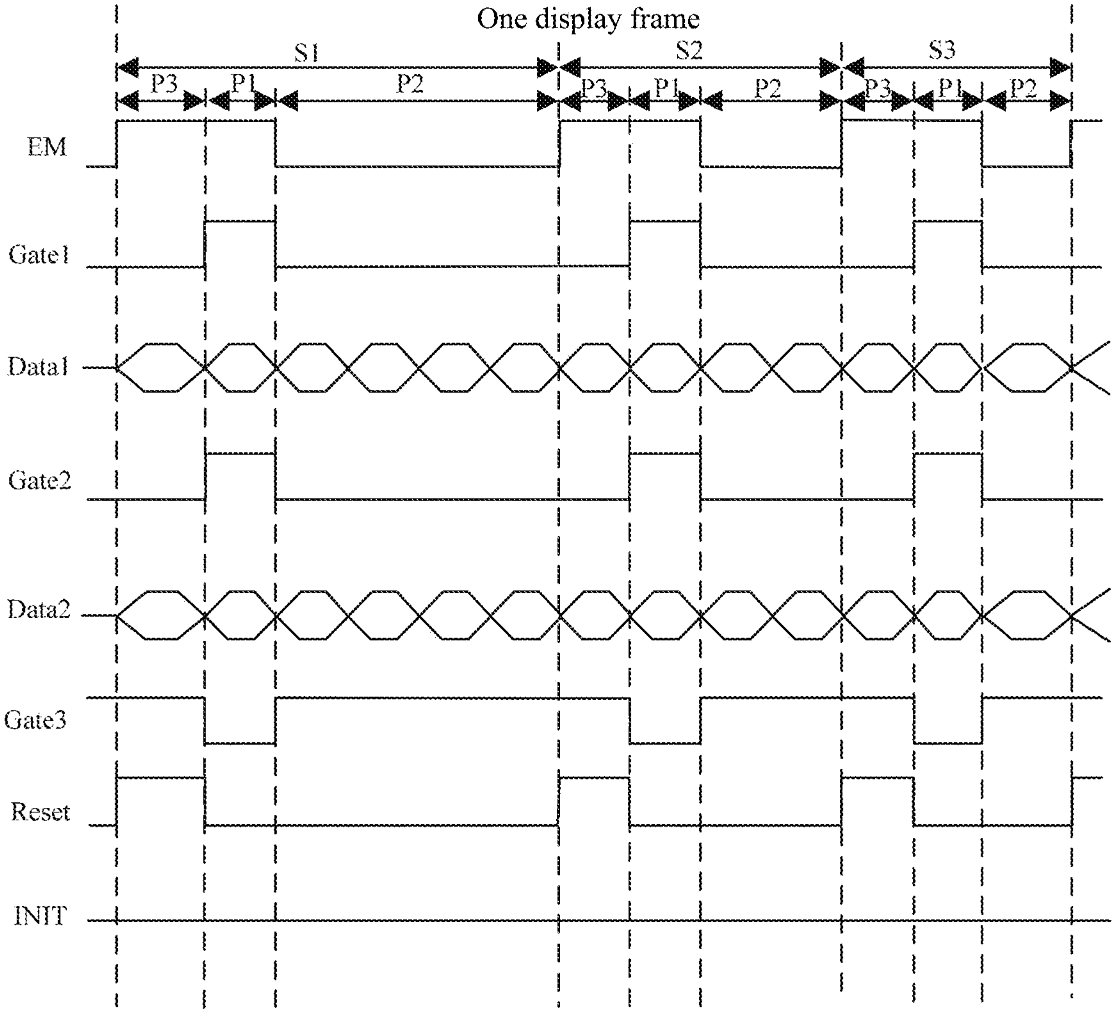
FIG. 22 is an operating timing diagram of the pixel circuit provided in FIG. 14 in a display stage.

Exemplary embodiments of the present disclosure are described below through an operation process of the pixel circuit illustrated in FIG. 14 in a display stage. FIG. 22 is an operating timing diagram of the pixel circuit provided in FIG. 14 in the display stage. FIG. 22 is illustrated by taking a case that the first transistor T1, the second transistor T2, the fifth transistor T5 to the seventh transistor T7 are N-type transistors and the third transistor T3 and the fourth transistor T4 are P-type transistors as an example. With reference to FIGS. 14 and 22, the operation process of the pixel circuit in a display sub-frame may include following stages.

In a reset stage P3, a signal of the reset signal terminal Reset is a high-level signal, the seventh transistor T7 is turned on, a signal of the initial signal terminal INIT is written to the third stage N3 through the turned-on seventh transistor T7, so that a first electrode of the light emitting element is reset. A signal of the first scan signal terminal Gate1 is a low-level signal, the second transistor T2 is turned off, a signal of the third scan signal terminal Gate3 is a high-level signal, the third transistor T3 is turned off. A signal of the second scan signal terminal Gate2 is a low-level signal, the sixth transistor T6 is turned off, a signal of the light emitting signal terminal EM is a high-level signal, the fourth transistor T4 is turned off, and the light emitting element L does not emit light.

In a light emitting data writing stage P1, the signal of the first scan signal terminal Gate1 is a high-level signal, the second transistor T2 is turned on, the signal of the third scan signal terminal Gate3 is a low-level signal, the third transistor T3 is turned on. The first data signal terminal Data1 outputs a data voltage, a signal of the first data signal terminal Data1 is written to the fourth node N4 through the turned-on second transistor T2 and the turned-on third transistor T3. The signal of the second scan signal terminal Gate2 is a high-level signal, the sixth transistor T6 is turned on, the second data signal terminal Data2 outputs a data voltage, a signal of the second data signal terminal Data2 is written to the fifth node N5 through the turned-on sixth transistor T6. When the signal of the second data signal terminal Data2 is a high-level signal, the fifth transistor T5 is turned on. When the signal of the second data signal terminal Data2 is a low-level signal, the fifth transistor T5 is turned off, the signal of the light emitting signal terminal EM is a high-level signal, the fourth transistor T4 is turned off, the signal of the reset signal terminal Reset is a low-level signal, the seventh transistor T7 is turned off, and the light emitting element L does not emit light.

In a light emitting stage P2, the signal of the light emitting signal terminal EM is a low-level signal, the fourth transistor T4 is turned on, the high-level signal of the first power supply terminal VDD is written to the second node N2 through the turned-on fourth transistor T4. The signal of the reset signal terminal Reset is a low-level signal, the seventh transistor T7 is turned off, the signal of the first scan signal terminal Gate1 is a low-level signal, the second transistor T2 is turned off. The signal of the third scan signal terminal Gate3 is a high-level signal, the third transistor T3 is turned off, the fourth node N4 maintains a signal of the previous stage, the first transistor T1 is turned on, the signal of the second scan signal terminal Gate2 is a low-level signal, the sixth transistor T6 is turned off, the fifth node N5 maintains a signal of the previous stage, and the fifth transistor T5 holds the turned-on or turned-off state of the previous stage. When the fifth transistor T5 is turned on, a current path between the first power supply terminal VDD and the third power supply terminal VSS is turned on, and the light emitting element L emits light, when the fifth transistor T5 is turned off, the current path between the first power supply terminal VDD and the third power supply terminal VSS is turned off, and the light emitting element L does not emit light.

Figure 23:
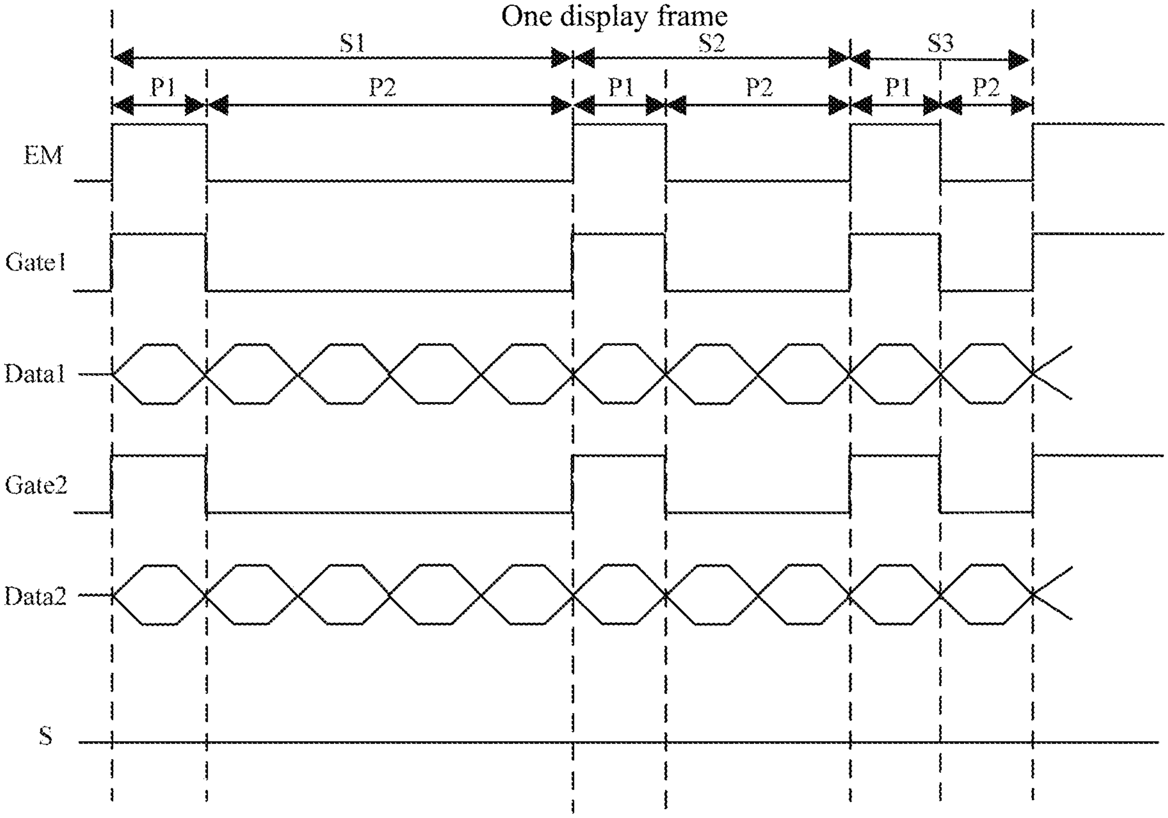
FIG. 23 is an operating timing diagram of the pixel circuit provided in FIG. 15 in a display stage.

Exemplary embodiments of the present disclosure are described below through an operation process of the pixel circuit illustrated in FIG. 15 in a display stage. FIG. 23 is an operating timing diagram of the pixel circuit provided in FIG. 15 in the display stage. FIG. 23 is illustrated by taking a case that the first transistor T1, the second transistor T2, the fifth transistor T5, the sixth transistor T6, and the eighth transistor T8 are N-type transistors and the fourth transistor T4 is a P-type transistor as an example. With reference to FIGS. 15 and 23, the operation process of the pixel circuit in a display sub-frame may include following stages.

In a light emitting data writing stage P1, a signal of the first scan signal terminal Gate1 is a high-level signal, the second transistor T2 and the eighth transistor T8 are turned on, and the first data signal terminal Data1 outputs a data voltage. A signal of the first data signal terminal Data1 is written to the fourth node N4 through the turned-on second transistor T2, a signal of the control signal terminal S is written to the first node N1 through the turned-on eighth transistor T8, a signal of the second scan signal terminal Gate2 is a high-level signal, the sixth transistor T6 is turned on, the second data signal terminal Data2 outputs a data voltage, and a signal of the second data signal terminal Data2 is written to the fifth node N5 through the turned-on sixth transistor T6. When the signal of the second data signal terminal Data2 is a high-level signal, the fifth transistor T5 is turned on, when the signal of the second data signal terminal Data2 is a low-level signal, the fifth transistor T5 is turned off, a signal of the light emitting signal terminal EM is a high-level signal, the fourth transistor T4 is turned off, and the light emitting element L does not emit light.

In a light emitting stage P2, the signal of the light emitting signal terminal EM is a low-level signal, the fourth transistor T4 is turned on, the high-level signal of the first power supply terminal VDD is written to the second node N2 through the turned-on fourth transistor T4. The signal of the first scan signal terminal Gate1 is a low-level signal, the second transistor T2 and the eighth transistor T8 are turned off, the fourth node N4 maintains a signal of the previous stage, and the first transistor T1 is turned on. The signal of the second scan signal terminal Gate2 is a low-level signal, the sixth transistor T6 is turned off, the fifth node N5 maintains a signal of the previous stage, and the fifth transistor T5 holds the turned-on or turned-off state of the previous stage. When the fifth transistor T5 is turned on, a current path between the first power supply terminal VDD and the third power supply terminal VSS is turned on, and the light emitting element L emits light, when the fifth transistor T5 is turned off, the current path between the first power supply terminal VDD and the third power supply terminal VSS is turned off, and the light emitting element L does not emit light.

Figure 24:
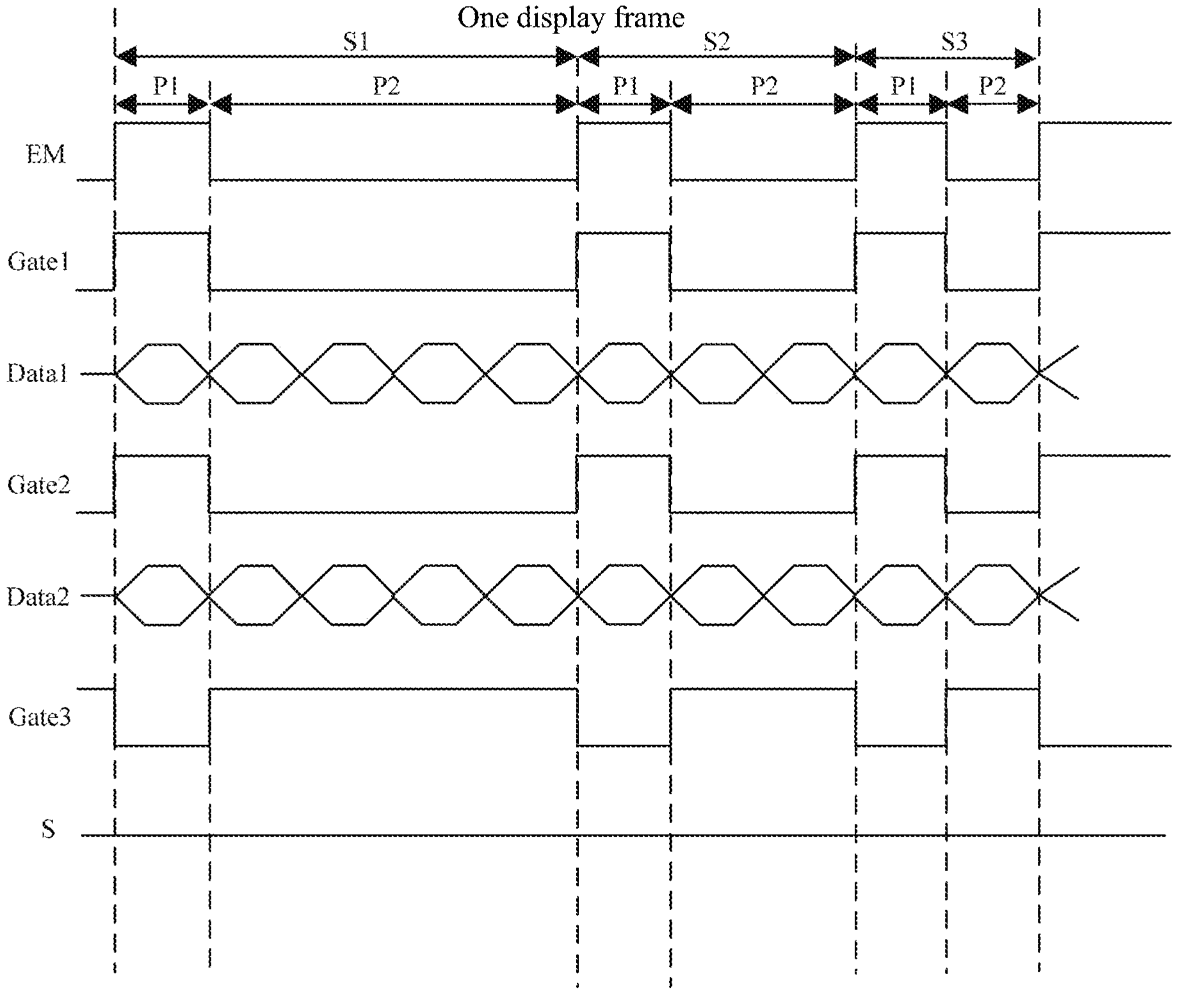
FIG. 24 is an operating timing diagram of the pixel circuit provided in FIG. 16 in a display stage.

Exemplary embodiments of the present disclosure are described below through an operation process of the pixel circuit illustrated in FIG. 16 in a display stage. FIG. 24 is an operating timing diagram of the pixel circuit provided in FIG. 16 in the display stage. FIG. 24 is illustrated by taking a case that the first transistor T1, the second transistor T2, the fifth transistor T5, the sixth transistor T6, and the eighth transistor T8 are N-type transistors and the third transistor T3 and the fourth transistor T4 are P-type transistors as an example. With reference to FIGS. 16 and 24, an operation process of the pixel circuit in a display sub-frame may include following stages.

In a light emitting data writing stage P1, a signal of the first scan signal terminal Gate1 is a high-level signal, the second transistor T2 and the eighth transistor T8 are turned on, a signal of the third scan signal terminal Gate3 is a low-level signal, the third transistor T3 is turned on. The first data signal terminal Data1 outputs a data voltage, a signal of the first data signal terminal Data1 is written to the fourth node N4 through the turned-on second transistor T2 and the turned-on third transistor T3, a signal of the control signal terminal S is written to the first node N1 through the turned-on eighth transistor T8. A signal of the second scan signal terminal Gate2 is a high-level signal, the sixth transistor T6 is turned on, the second data signal terminal Data2 outputs a data voltage, and a signal of the second data signal terminal Data2 is written to the fifth node N5 through the turned-on sixth transistor T6. When the signal of the second data signal terminal Data2 is a high-level signal, the fifth transistor T5 is turned on, when the signal of the second data signal terminal Data2 is a low-level signal, the fifth transistor T5 is turned off, a signal of the light emitting signal terminal EM is a high-level signal, the fourth transistor T4 is turned off, and the light emitting element L does not emit light.

In a light emitting stage P2, the signal of the light emitting signal terminal EM is a low-level signal, the fourth transistor T4 is turned on, a high-level signal of the first power supply terminal VDD is written to the second node N2 through the turned-on fourth transistor T4. The signal of the first scan signal terminal Gate1 is a low-level signal, the second transistor T2 and the eighth transistor T8 are turned off. The signal of the third scan signal terminal Gate3 is a high-level signal, the third transistor T3 is turned off, the fourth node N4 maintains a signal of the previous stage, and the first transistor T1 is turned on. The signal of the second scan signal terminal Gate2 is a low-level signal, the sixth transistor T6 is turned off, the fifth node N5 maintains a signal of the previous stage, and the fifth transistor T5 holds the turned-on or turned-off state of the previous stage. When the fifth transistor T5 is turned on, a current path between the first power supply terminal VDD and the third power supply terminal VSS is turned on, and the light emitting element L emits light. When the fifth transistor T5 is turned off, the current path between the first power supply terminal VDD and the third power supply terminal VSS is turned off, and the light emitting element L does not emit light.

Figure 25:
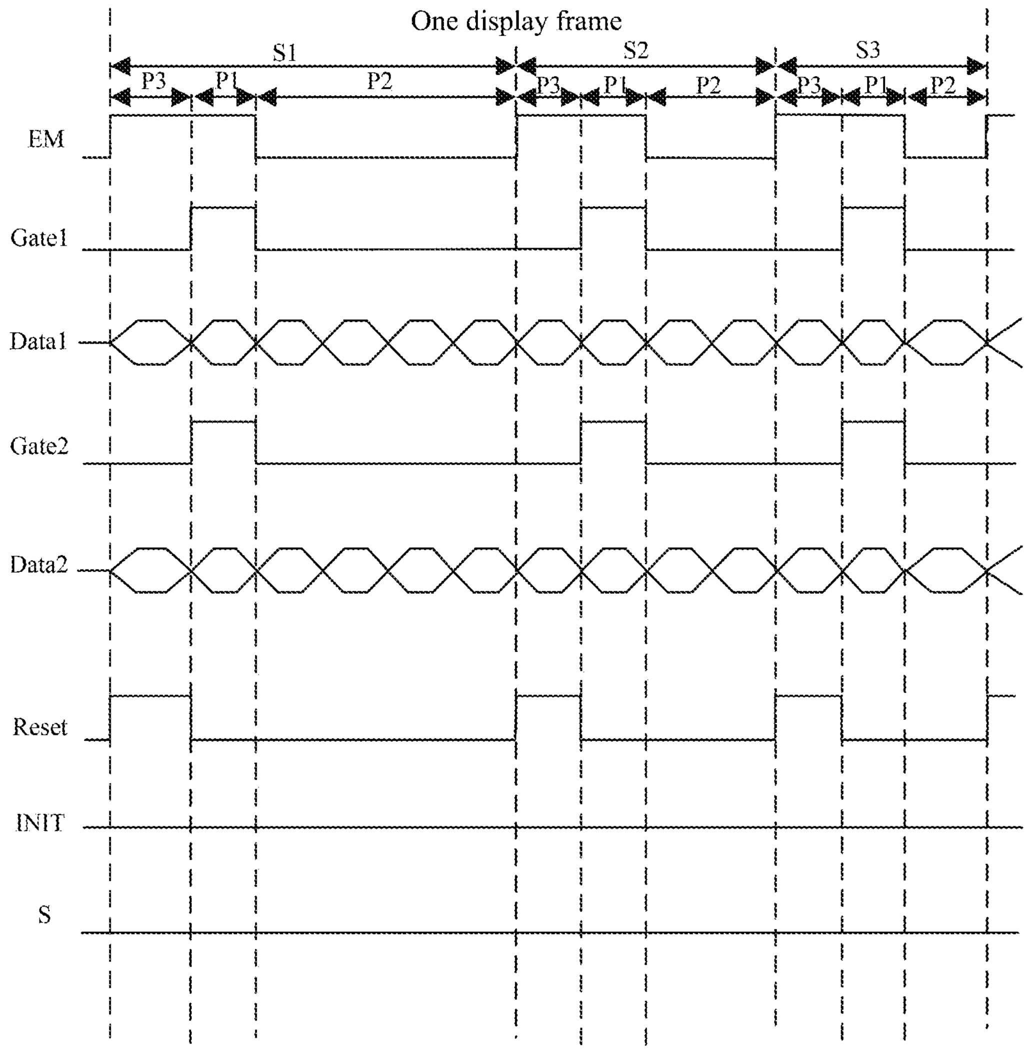
FIG. 25 is an operating timing diagram of the pixel circuit provided in FIG. 17 in a display stage.

Exemplary embodiments of the present disclosure are described below through an operation process of the pixel circuit illustrated in FIG. 17 in a display stage. FIG. 25 is an operating timing diagram of the pixel circuit provided in FIG. 17 in the display stage. FIG. 25 is illustrated by taking a case that the first transistor T1, the second transistor T2, the fifth transistor T5 to the eighth transistor T8 are N-type transistors and the fourth transistor T4 is a P-type transistor as an example. With reference to FIGS. 17 and 25, the operation process of the pixel circuit in a display sub-frame may include following stages.

In a reset stage P3, a signal of the reset signal terminal Reset is a high-level signal, the seventh transistor T7 is turned on, a signal of the initial signal terminal INIT is written to the third node N3 through the turned-on seventh transistor T7, so that a first electrode of the light emitting element is reset. A signal of the first scan signal terminal Gate1 is a low-level signal, the second transistor T2 and the eighth transistor T8 are turned off, a signal of the second scan signal terminal Gate2 is a low-level signal, the sixth transistor T6 is turned off, a signal of the light emitting signal terminal EM is a high-level signal, the fourth transistor T4 is turned off, and the light emitting element L does not emit light.

In a light emitting data writing stage P1, the signal of the first scan signal terminal Gate1 is a high-level signal, the second transistor T2 and the eighth transistor T8 are turned on, and the first data signal terminal Data1 outputs a data voltage. A signal of the first data signal terminal Data1 is written to the fourth node N4 through the turned-on second transistor T2, a signal of the control signal terminal S is written to the first node N1 through the turned-on eighth transistor T8. The signal of the second scan signal terminal Gate2 is a high-level signal, the sixth transistor T6 is turned on, the second data signal terminal Data2 outputs a data voltage, and the signal of the second data signal terminal Data2 is written to the fifth node N5 through the turned-on sixth transistor T6. When the signal of the second data signal terminal Data2 is a high-level signal, the fifth transistor T5 is turned on, when the signal of the second data signal terminal Data2 is a low-level signal, the fifth transistor T5 is turned off, the signal of the light emitting signal terminal EM is a high-level signal, the fourth transistor T4 is turned off, the signal of the reset signal terminal Reset is a low-level signal, the seventh transistor T7 is turned off, and the light emitting element L does not emit light.

In a light emitting stage P2, the signal of the light emitting signal terminal EM is a low-level signal, the fourth transistor T4 is turned on, the high-level signal of the first power supply terminal VDD is written to the second node N2 through the turned-on fourth transistor T4. The signal of the reset signal terminal Reset is a low-level signal, the seventh transistor T7 is turned off, the signal of the first scan signal terminal Gate1 is a low-level signal, the second transistor T2 and the eighth transistor T8 are turned off. The fourth node N4 maintains a signal of the previous stage, the first transistor T1 is turned on, the signal of the second scan signal terminal Gate2 is a low-level signal, the sixth transistor T6 is turned off, the fifth node N5 maintains a signal of the previous stage, and the fifth transistor T5 holds the turned-on or turned-off state of the previous stage. When the fifth transistor T5 is turned on, a current path between the first power supply terminal VDD and the third power supply terminal VSS is turned on, and the light emitting element L emits light, when the fifth transistor T5 is turned off, the current path between the first power supply terminal VDD and the third power supply terminal VSS is turned off, and the light emitting element L does not emit light.

Figure 26:
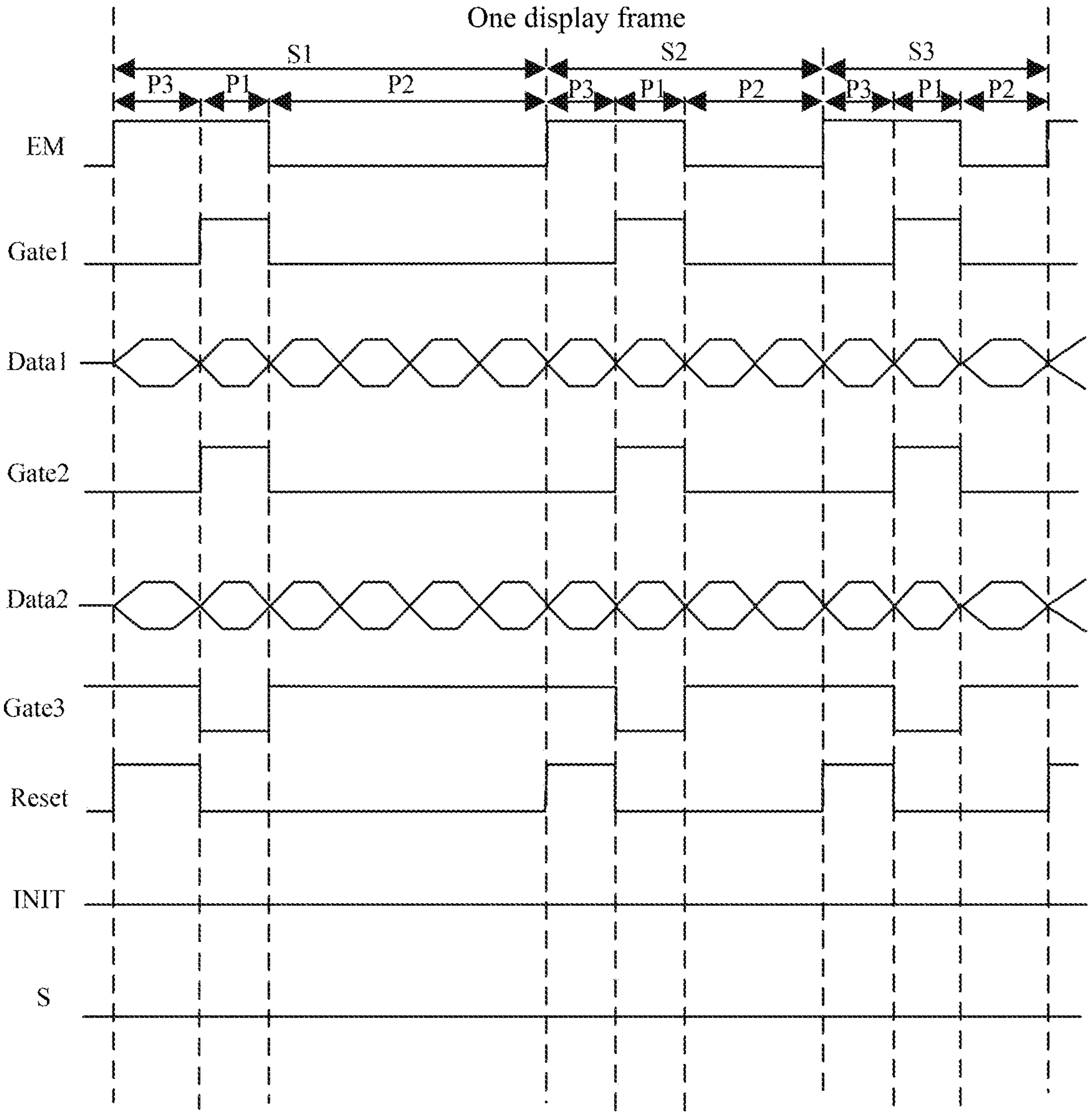
FIG. 26 is an operating timing diagram of the pixel circuit provided in FIG. 18 in a display stage.

Exemplary embodiments of the present disclosure are described below through an operation process of the pixel circuit illustrated in FIG. 18 in the display stage. FIG. 26 is an operating timing diagram of the pixel circuit provided in FIG. 18 in a display stage. FIG. 26 is illustrated by taking a case that the first transistor T1, the second transistor T2, the fifth transistor T5 to the eighth transistor T8 are N-type transistors, and the third transistor T3 and the fourth transistor T4 are P-type transistors as an example. With reference to FIGS. 18 and 26, the operation process of the pixel circuit in a display sub-frame may include following stages.

In a reset stage P3, a signal of the reset signal terminal Reset is a high-level signal, the seventh transistor T7 is turned on, a signal of the initial signal terminal INIT is written to the third stage N3 through the turned-on seventh transistor T7, so that a first electrode of the light emitting element is reset. A signal of the first scan signal terminal Gate1 is a low-level signal, the second transistor T2 and the eighth transistor T8 are turned off, a signal of the third scan signal terminal Gate3 is a high-level signal, and the third transistor T3 is turned off. A signal of the second scan signal terminal Gate2 is a low-level signal, the sixth transistor T6 is turned off, a signal of the light emitting signal terminal EM is a high-level signal, the fourth transistor T4 is turned off, and the light emitting element L does not emit light.

In a light emitting data writing stage P1, the signal of the first scan signal terminal Gate1 is a high-level signal, the second transistor T2 and the eighth transistor T8 are turned on, the signal of the third scan signal terminal Gate3 is a low-level signal, the third transistor T3 is turned on. The first data signal terminal Data1 outputs a data voltage, a signal of the first data signal terminal Data1 is written to the fourth node N4 through the turned-on second transistor T2 and the turned-on third transistor T3, and a signal of the control signal terminal S is written to the first node N1 through the turned-on eighth transistor T8. The signal of the second scan signal terminal Gate2 is a high-level signal, the sixth transistor T6 is turned on, the second data signal terminal Data2 outputs a data voltage, and the signal of the second data signal terminal Data2 is written to the fifth node N5 through the turned-on sixth transistor T6. When the signal of the second data signal terminal Data2 is a high-level signal, the fifth transistor T5 is turned on, when the signal of the second data signal terminal Data2 is a low-level signal, the fifth transistor T5 is turned off, the signal of the light emitting signal terminal EM is a high-level signal, the fourth transistor T4 is turned off, the signal of the reset signal terminal Reset is a low-level signal, the seventh transistor T7 is turned off, and the light emitting element L does not emit light.

In a light emitting stage P2, the signal of the light emitting signal terminal EM is a low-level signal, the fourth transistor T4 is turned on, a high-level signal of the first power supply terminal VDD is written to the second node N2 through the turned-on fourth transistor T4. The signal of the reset signal terminal Reset is a low-level signal, the seventh transistor T7 is turned off, the signal of the first scan signal terminal Gate1 is a low-level signal, the second transistor T2 and the eighth transistor T8 are turned off, the signal of the third scan signal terminal Gate3 is a high-level signal, the third transistor T3 is turned off. The fourth node N4 maintains a signal of a previous stage, the first transistor T1 is turned on, the signal of the second scan signal terminal Gate2 is a low-level signal, the sixth transistor T6 is turned off, the fifth node N5 maintains a signal of a previous stage, the fifth transistor T5 holds the turned-on or turned-off state of the previous stage. When the fifth transistor T5 is turned on, a current path between the first power supply terminal VDD and the third power supply terminal VSS is turned on, and the light emitting element L emits light, when the fifth transistor T5 is turned off, the current path between the first power supply terminal VDD and the third power supply terminal VSS is turned off, and the light emitting element L does not emit light.

In the present disclosure, according to the signal of the second data signal terminal Data2, the fifth transistor T5 is controlled to be turned on or turned off in at least one display sub-frame within a display frame, and under a same drive current in the current path between the first power supply terminal VDD and the third power supply terminal VSS, the light emitting element emits light for different time length, so as to achieve an effect of different brightness and gray scale.

In an exemplary embodiment, FIGS. 19 to 26 are illustrated by taking a case that one display frame includes three display sub-frames, and a ratio of a time length of a light emitting stage P2 of a display sub-frame S1, a time length of a light emitting stage P2 of a display sub-frame S2 and a time length of a light emitting stage P2 of a display sub-frame S3 may be 4:2:1 as an example.

The drive control sub-circuit and the light emitting control sub-circuit in the present disclosure are configured to control a voltage amplitude of a control electrode of the first transistor, so that the light emitting brightness amplitude of the light emitting element L can be controlled. The time-length control sub-circuit controls a time length of the current path of the pixel circuit and controls a total brightness of the light emitting element L in a display frame.

Figure 27:
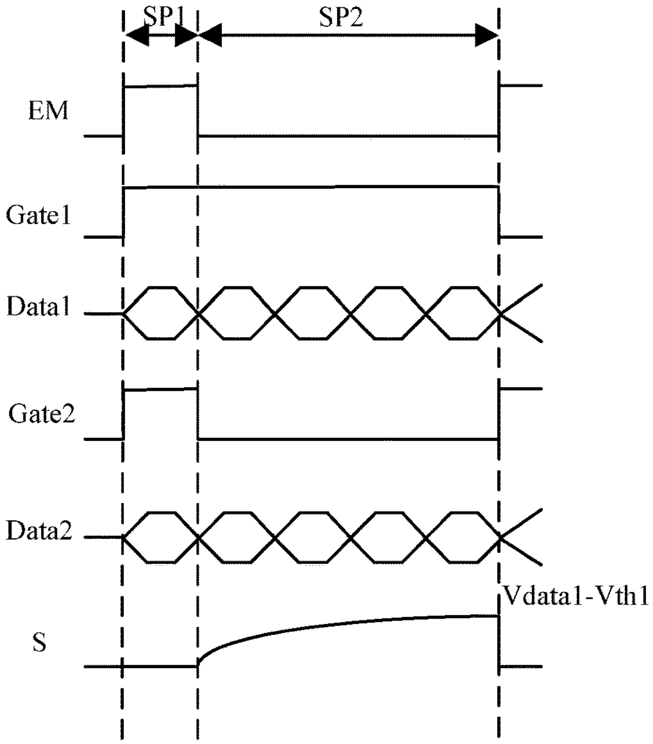
FIG. 27 is an operating timing diagram of the pixel circuit provided in FIGS. 15 and 17 in a non-display stage.

Exemplary embodiments of the present disclosure are described below through an operation process of the pixel circuit illustrated in FIGS. 15 and 17 in a non-display stage. FIG. 27 is an operating timing diagram of the pixel circuit provided in FIGS. 15 and 17 in a non-display stage.

In conjunction with FIG. 15, FIG. 17, and FIG. 27, the operation process of the pixel circuit in a non-display stage may include following stages.

In a compensation data writing stage SP1, a signal of the light emitting signal terminal EM is a high-level signal, the fourth transistor T4 is turned off, a signal of the first scan signal terminal Gate1 is a high-level signal, the first data signal terminal Data1 outputs a data voltage, the second transistor T2 and the eighth transistor T8 are turned on. A signal of the first data signal terminal Data1 is written to the fourth node N4 through the turned-on second transistor T2, the first transistor T1 is turned on, and a signal of the control signal terminal S is written to the first node N1 through the turned-on eighth transistor T8. A signal of the second scan signal terminal Gate2 is a high-level signal, the second data signal terminal Data2 outputs a low-level data voltage, the sixth transistor T6 is turned on, a signal of the second data signal terminal Data2 is written to the fifth node N5 through the turned-on sixth transistor T6, and the fifth transistor T5 is turned off.

In a compensation stage SP2, the signal of the second scan signal terminal Gate2 is a low-level signal, the sixth transistor T6 is turned off, the fifth node N5 maintains a signal of the previous stage, and the fifth transistor T5 is turned off. The signal of the light emitting signal terminal EM is a low-level signal, the fourth transistor T4 is turned on, a signal of the first power supply terminal VDD is written to the second node N2 through the turned-on fourth transistor T4. The signal of the first scan signal terminal Gate1 is a high-level signal, the first data signal terminal Data1 outputs a data voltage, the second transistor T2 and the eighth transistor T8 are continuously turned on. The signal of the first data signal terminal Data1 is written to the fourth node N4 through the turned-on second transistor T2. The first transistor T1 is turned on, the signal of the first power supply terminal VDD is charged to the first node N1 through the turned-on fourth transistor T4, the second node N2 and the turned-on first transistor T1, until the voltage value of a signal of the first node N1 is Vdata1−Vth1, wherein Vdata1 is a voltage value of the signal of the first data signal terminal Data1, and Vth1 is a threshold voltage of the first transistor. At this time, a voltage difference between two ends of the first capacitor C1 is Vth1, the first transistor T1 is turned off, and the signal of the first node N1 can be read to the control signal terminal S through the turned-on eighth transistor T8.

Figure 28:
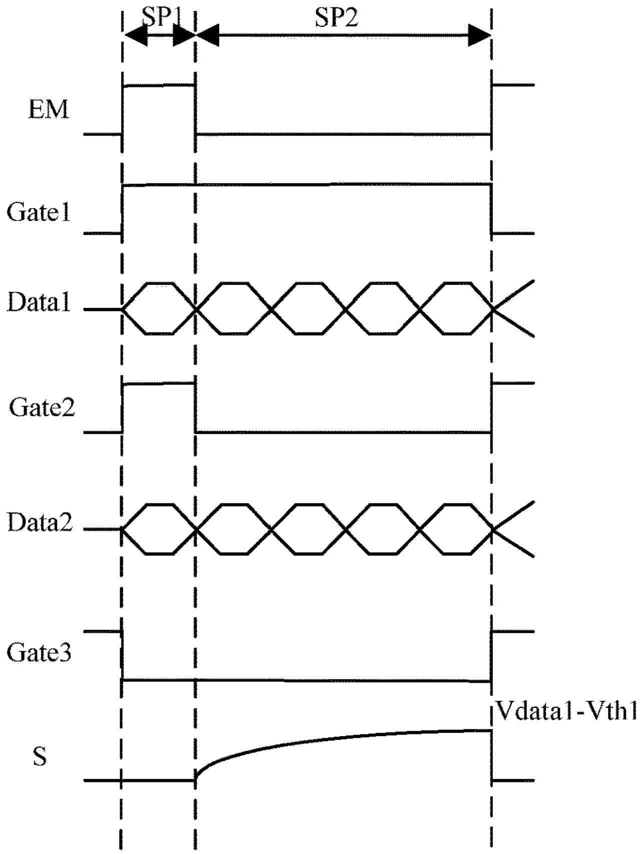
FIG. 28 is an operating timing diagram of the pixel circuit provided in FIGS. 16 and 18 in a non-display stage.

Exemplary embodiments of the present disclosure are described below through an operation process of the pixel circuit illustrated in FIGS. 16 and 18 in a non-display stage. FIG. 28 is an operating timing diagram of the pixel circuit provided in FIGS. 16 and 18 in a non-display stage.

With reference to FIG. 16, FIG. 18, and FIG. 28, the operation process of the pixel circuit in a non-display stage may include following stages.

In a compensation data writing stage SP1, a signal of the light emitting signal terminal EM is a high-level signal, the fourth transistor T4 is turned off, a signal of the first scan signal terminal Gate1 is a high-level signal, the first data signal terminal Data1 outputs a data voltage, the second transistor T2 and the eighth transistor T8 are turned on. A signal of the third scan signal terminal Gate3 is a low-level signal, the third transistor T3 is turned on, a signal of the first data signal terminal Data1 is written to the fourth node N4 through the turned-on second transistor T2 and the turned-on third transistor T3. The first transistor T1 is turned on, and a signal of the control signal terminal S is written to the first node N1 through the turned-on eighth transistor T8. A signal of the second scan signal terminal Gate2 is a high-level signal, the second data signal terminal Data2 outputs a low-level data voltage, the sixth transistor T6 is turned on, a signal of the second data signal terminal Data2 is written to the fifth node N5 through the turned-on sixth transistor T6, and the fifth transistor T5 is turned off.

In a compensation stage SP2, the signal of the second scan signal terminal Gate2 is a low-level signal, the sixth transistor T6 is turned off, the fifth node N5 maintains a signal of the previous stage, and the fifth transistor T5 is turned off. The signal of the light emitting signal terminal EM is a low-level signal, the fourth transistor T4 is turned on, a signal of the first power supply terminal VDD is written to the second node N2 through the turned-on fourth transistor T4. The signal of the first scan signal terminal Gate1 is a high-level signal, the first data signal terminal Data1 outputs a data voltage, the second transistor T2 and the eighth transistor T8 are continuously turned on. The signal of the third scan signal terminal Gate3 is a low-level signal, the third transistor T3 is turned on, the signal of the first data signal terminal Data1 is written to the fourth node N4 via the second transistor T2 and the third transistor T3 which are turned on. The first transistor T1 is turned on, the signal of the first power supply terminal VDD is charged to the first node N1 through the turned-on fourth transistor T4, the turned-on second node N2 and the turned-on first transistor T1, until a voltage value of a signal of the first node N1 is Vdata1−Vth1, wherein Vdata1 is a voltage value of the signal of the first data signal terminal Data1, and Vth1 is a threshold voltage of the first transistor. At this time, a voltage difference between two ends of the first capacitor C1 is Vth1, the first transistor T1 is turned off, and the signal of the first node N1 can be read to the control signal terminal S through the turned-on eighth transistor T8.

According to the present disclosure, the threshold voltage Vth1 of the first transistor can be obtained according to the signal of the control signal terminal S by reading the signal of the first node N1 to the control signal terminal S, and the data signal of the first data signal terminal Data1 in a display stage is externally compensated according to the threshold voltage Vth1 of the first transistor.

An embodiment of the present disclosure further provides a method for driving the pixel circuit, which is configured to drive the pixel circuit. The pixel circuit is located in a display substrate, and the display substrate has a display stage, the display stage includes multiple display frames. The display frame includes at least one display sub-frame, and each display sub-frame includes a light emitting data writing stage and a light emitting stage. The method for driving the pixel circuit according to the embodiment of the present disclosure may include the following steps.

In step 100, in the light emitting data writing stage, the drive control sub-circuit provides a drive current to the first node under control of the first scan signal terminal, the first data signal terminal and the second node, and the time-length control sub-circuit provides a signal of the first node to the third node under control of the second scan signal terminal and the second data signal terminal.

In step 200, in the light emitting stage, the light emitting control sub-circuit provides a signal of the first power supply terminal to the second node under control of the light emitting signal terminal.

The pixel circuit is the pixel circuit according to any one of the foregoing embodiments, and the implementation principles and implementation effects are similar, which will not be repeated here.

In an exemplary embodiment, the pixel circuit may further include a reset sub-circuit, the display sub-frame may further include a reset stage, and the method for driving the pixel circuit according to an exemplary embodiment may further include the following steps.

In the reset stage, the reset sub-circuit provides a signal of the initial signal terminal to the third node under control of the reset signal terminal.

In an exemplary embodiment, the pixel circuit may further include a node control sub-circuit, the display substrate may further include a non-display stage. The non-display stage includes a compensation data writing stage and a compensation stage, and the method for driving the pixel circuit according to an exemplary embodiment may further include the following steps.

In the light emitting data writing stage and the compensation data writing stage, the node control sub-circuit provides a signal of the control signal terminal to the first node under control of the first scan signal terminal.

In the compensation stage, the node control sub-circuit reads a signal of the first node to the control signal terminal under control of the first scan signal terminal.

An embodiment of the present disclosure further provides a display substrate, which includes a display area and a non-display area surrounding at least one side of the display area, wherein the display area is provided with multiple pixels, and a pixel circuit is disposed in the pixel.

The pixel circuit is a pixel circuit according to any one of the foregoing embodiments, and the implementations principle and implementation effects are similar, which will not be repeated here.

The display substrate according to the embodiment of the present disclosure may be applied to display products with any resolution.

In an exemplary embodiment, when the pixel circuit includes a node control sub-circuit, the display substrate further includes a first chip connected with the control signal terminal and a second chip connected with the first data signal terminal. Here, the first chip is configured to provide a signal to the control signal terminal in the display stage, read the signal of the control signal terminal in the non-display stage, and is further configured to obtain a threshold voltage of the first transistor according to the signal of the control signal terminal, generate a control signal according to the threshold voltage of the first transistor, and send the control signal to the second chip, and the second chip provides a signal to the first data signal terminal according to the control signal.

According to the present disclosure, the first data signal terminal can be externally compensated according to the first chip, so that the service life of the display substrate can be prolonged and the display effect of the display substrate can be improved.

An embodiment of the present disclosure further provides a display device including a display substrate.

The display substrate is a display substrate according to any of the aforementioned embodiments, and has similar implementation principles and implementation effects, which will not be repeated here.

In an exemplary embodiment, the display device may be any product or component with a display function, such as a liquid crystal panel, electronic paper, an OLED panel, an Active-Matrix Organic Light Emitting Diode (AMOLED for short) panel, a mobile phone, a tablet computer, a television, a display, a laptop computer, a digital photo frame, or a navigator.

The accompanying drawings of the present disclosure only involve the structures involved in the embodiments of the present disclosure, and other structures may refer to usual designs.

For the sake of clarity, in the accompanying drawings used for describing the embodiments of the present disclosure, a thickness and dimension of a layer or a micro structure is enlarged. It may be understood that when an element such as a layer, a film, a region, or a substrate is described as being "on" or "under" another element, the element may be "directly" located "on" or "under" the other element, or there may be an intermediate element.

Although the embodiments disclosed in the present disclosure are as above, the described contents are only embodiments used for convenience of understanding the present disclosure and are not intended to limit the present disclosure. Any person skilled in the art to which the present disclosure pertains may make any modification and variation to implementation modes and details without departing from the spirit and scope disclosed in the present disclosure. However, the scope of patent protection of the present disclosure is still subject to the scope defined by the appended claims.

The invention claimed is:

1. A pixel circuit comprising: a drive circuit and a light emitting element connected in series between a first power supply terminal and a third power supply terminal; the drive circuit is configured to provide a drive current and control a time length of conduction of a current path between the first power supply terminal and the third power supply terminal; the light emitting element is configured to receive the drive current in the current path and emit light; the drive circuit comprises a drive control sub-circuit, a light emitting control sub-circuit and a time-length control sub-circuit;

the drive control sub-circuit is electrically connected with a first scan signal terminal, a first data signal terminal, a first node and a second node respectively, and is configured to provide the drive current to the first node under control of the first scan signal terminal, the first data signal terminal and the second node;

the light emitting control sub-circuit is electrically connected with a light emitting signal terminal, the first power supply terminal and the second node respectively, and is configured to provide a signal of the first power supply terminal to the second node under control of the light emitting signal terminal;

the time-length control sub-circuit is electrically connected with a second scan signal terminal, a second data signal terminal, a second power supply terminal, the first node and a third node respectively, and is configured to provide a signal of the first node to the third node under control of the second scan signal terminal and the second data signal terminal; and the light emitting element is electrically connected with the third node and the third power supply terminal respectively.

2. The pixel circuit according to claim 1, wherein when a signal of the first scan signal terminal is an effective level signal, a signal of the second scan signal terminal is an effective level signal, and a signal of the light emitting signal terminal is an ineffective level signal;

when the signal of the light emitting signal terminal is an effective level signal, the signals of the first scan signal terminal and the second scan signal terminal are ineffective level signals.

3. The pixel circuit according to claim 2, wherein the drive control sub-circuit is further electrically connected with a third scan signal terminal, is configured to provide a drive current to the first node under control of the first scan signal terminal, the third scan signal terminal, the first data signal terminal and the second node;

when the signal of the first scan signal terminal is an effective level signal, a signal of the third scan signal terminal is an effective level signal; and when the signal of the light emitting signal terminal is an effective level signal, the signal of the third scan signal terminal is an ineffective level signal.

4. The pixel circuit according to claim 3, wherein the drive control sub-circuit comprises: a first transistor, a second transistor, a third transistor, and a first capacitor;

a control electrode of the first transistor is electrically connected with a fourth node, a first electrode of the first transistor is electrically connected with the second node, and a second electrode of the first transistor is electrically connected with the first node;

a control electrode of the second transistor is electrically connected with the first scan signal terminal, a first electrode of the second transistor is electrically connected with the first data signal terminal, and a second electrode of the second transistor is electrically connected with the fourth node;

a control electrode of the third transistor is electrically connected with the third scan signal terminal, a first electrode of the third transistor is electrically connected with the first data signal terminal, and a second electrode of the third transistor is electrically connected with the fourth node;

one plate of the first capacitor is electrically connected with the fourth node, and the other plate of the first capacitor is electrically connected with a fourth power supply terminal or the first node; and the second transistor and the third transistor are of different transistor types.

5. The pixel circuit according to claim 2, further comprising: a reset sub-circuit and/or a node control sub-circuit;

the reset sub-circuit is electrically connected with a reset signal terminal, an initial signal terminal and the third node respectively, and is configured to provide a signal of the initial signal terminal to the third node under control of the reset signal terminal;

the node control sub-circuit is electrically connected with the first scan signal terminal, a control signal terminal and the first node respectively, and is configured to provide a signal of the control signal terminal to the first node or read the signal of the first node to the control signal terminal under control of the first scan signal terminal, wherein a voltage value of the signal of the control signal terminal is constant.

6. The pixel circuit according to claim 5, wherein when a signal of the reset signal terminal is an effective level signal, signals of the first scan signal terminal, the second scan signal terminal and the light emitting signal terminal are ineffective level signals;

when the signal of the first scan signal terminal is an effective level signal, the signal of the reset signal terminal is an ineffective level signal; and when the signal of the light emitting signal terminal is an effective level signal, the signal of the reset signal terminal is an ineffective level signal.

7. The pixel circuit according to claim 5, wherein the reset sub-circuit comprises: a seventh transistor;

a control electrode of the seventh transistor is electrically connected with the reset signal terminal, a first electrode of the seventh transistor is electrically connected with the initial signal terminal, and a second electrode of the seventh transistor is electrically connected with the third node; or wherein the node control sub-circuit comprises: an eighth transistor; and a control electrode of the eighth transistor is electrically connected with the first scan signal terminal, a first electrode of the eighth transistor is electrically connected with the control signal terminal, and a second electrode of the eighth transistor is electrically connected with the first node.

8. The pixel circuit according to claim 1, wherein the drive control sub-circuit comprises: a first transistor, a second transistor, and a first capacitor;

a control electrode of the first transistor is electrically connected with a fourth node, a first electrode of the first transistor is electrically connected with the second node, and a second electrode of the first transistor is electrically connected with the first node;

a control electrode of the second transistor is electrically connected with the first scan signal terminal, a first electrode of the second transistor is electrically connected with the first data signal terminal, and a second electrode of the second transistor is electrically connected with the fourth node; and one plate of the first capacitor is electrically connected with the fourth node, and the other plate of the first capacitor is electrically connected with a fourth power supply terminal or the first node.

9. The pixel circuit according to claim 1, wherein the light emitting control sub-circuit comprises a fourth transistor;

a control electrode of the fourth transistor is electrically connected with the light emitting signal terminal, a first electrode of the fourth transistor is electrically connected with the first power supply terminal, and a second electrode of the fourth transistor is electrically connected with the second node.

10. The pixel circuit according to claim 1, wherein the time-length control sub-circuit comprises: a fifth transistor, a sixth transistor, and a second capacitor;

a control electrode of the fifth transistor is electrically connected with a fifth node, a first electrode of the fifth transistor is electrically connected with the first node, and a second electrode of the fifth transistor is electrically connected with the third node;

a control electrode of the sixth transistor is electrically connected with the second scan signal terminal, a first electrode of the sixth transistor is electrically connected with the second data signal terminal, and a second electrode of the sixth transistor is electrically connected with the fifth node; and one plate of the second capacitor is electrically connected with the fifth node, and the other plate of the second capacitor is electrically connected with the second power supply terminal.

11. The pixel circuit according to claim 1, wherein the drive control sub-circuit comprises: a first transistor, a second transistor, and a first capacitor, the light emitting control sub-circuit comprises: a fourth transistor, and the time-length control sub-circuit comprises: a fifth transistor, a sixth transistor, and a second capacitor;

a control electrode of the first transistor is electrically connected with a fourth node, a first electrode of the first transistor is electrically connected with the second node, and a second electrode of the first transistor is electrically connected with the first node;

a control electrode of the second transistor is electrically connected with the first scan signal terminal, a first electrode of the second transistor is electrically connected with the first data signal terminal, and a second electrode of the second transistor is electrically connected with the fourth node;

a control electrode of the fourth transistor is electrically connected with the light emitting signal terminal, a first electrode of the fourth transistor is electrically connected with the first power supply terminal, and a second electrode of the fourth transistor is electrically connected with the second node;

a control electrode of the fifth transistor is electrically connected with a fifth node, a first electrode of the fifth transistor is electrically connected with the first node, and a second electrode of the fifth transistor is electrically connected with the third node;

a control electrode of the sixth transistor is electrically connected with the second scan signal terminal, a first electrode of the sixth transistor is electrically connected with the second data signal terminal, and a second electrode of the sixth transistor is electrically connected with the fifth node;

one plate of the first capacitor is electrically connected with the fourth node, and the other plate of the first capacitor is electrically connected with a fourth power supply terminal or the first node; and one plate of the second capacitor is electrically connected with the fifth node, and the other plate of the second capacitor is electrically connected with the second power supply terminal.

12. The pixel circuit according to claim 1, wherein the drive control sub-circuit comprises: a first transistor, a second transistor, a third transistor, and a first capacitor, the light emitting control sub-circuit comprises: a fourth transistor, and the time-length control sub-circuit comprises: a fifth transistor, a sixth transistor, and a second capacitor;

a control electrode of the first transistor is electrically connected with a fourth node, a first electrode of the first transistor is electrically connected with the second node, and a second electrode of the first transistor is electrically connected with the first node;

a control electrode of the second transistor is electrically connected with the first scan signal terminal, a first electrode of the second transistor is electrically connected with the first data signal terminal, and a second electrode of the second transistor is electrically connected with the fourth node;

a control electrode of the third transistor is electrically connected with a third scan signal terminal, a first electrode of the third transistor is electrically connected with the first data signal terminal, and a second electrode of the third transistor is electrically connected with the fourth node;

a control electrode of the fourth transistor is electrically connected with the light emitting signal terminal, a first electrode of the fourth transistor is electrically connected with the first power supply terminal, and a second electrode of the fourth transistor is electrically connected with the second node;

a control electrode of the fifth transistor is electrically connected with a fifth node, a first electrode of the fifth transistor is electrically connected with the first node, and a second electrode of the fifth transistor is electrically connected with the third node;

a control electrode of the sixth transistor is electrically connected with the second scan signal terminal, a first electrode of the sixth transistor is electrically connected with the second data signal terminal, and a second electrode of the sixth transistor is electrically connected with the fifth node;

one plate of the first capacitor is electrically connected with the fourth node, and the other plate of the first capacitor is electrically connected with the fourth power supply terminal or the first node;

one plate of the second capacitor is electrically connected with the fifth node, and the other plate of the second capacitor is electrically connected with the second power supply terminal; and the second transistor and the third transistor are of opposite transistor types.

13. The pixel circuit according to claim 1, further comprising: a reset sub-circuit and/or a node control sub-circuit, the drive control sub-circuit comprises a first transistor, a second transistor and a first capacitor, the light emitting control sub-circuit comprises a fourth transistor, the time-length control sub-circuit comprises a fifth transistor, a sixth transistor and a second capacitor, the reset sub-circuit comprises a seventh transistor, and the node control sub-circuit comprises an eighth transistor;

a control electrode of the first transistor is electrically connected with a fourth node, a first electrode of the first transistor is electrically connected with the second node, and a second electrode of the first transistor is electrically connected with the first node;

a control electrode of the second transistor is electrically connected with the first scan signal terminal, a first electrode of the second transistor is electrically connected with the first data signal terminal, and a second electrode of the second transistor is electrically connected with the fourth node;

a control electrode of the fourth transistor is electrically connected with the light emitting signal terminal, a first electrode of the fourth transistor is electrically connected with the first power supply terminal, and a second electrode of the fourth transistor is electrically connected with the second node;

a control electrode of the fifth transistor is electrically connected with a fifth node, a first electrode of the fifth transistor is electrically connected with the first node, and a second electrode of the fifth transistor is electrically connected with the third node;

a control electrode of the sixth transistor is electrically connected with the second scan signal terminal, a first electrode of the sixth transistor is electrically connected with the second data signal terminal, and a second electrode of the sixth transistor is electrically connected with the fifth node;

a control electrode of the seventh transistor is electrically connected with a reset signal terminal, a first electrode of the seventh transistor is electrically connected with an initial signal terminal, and a second electrode of the seventh transistor is electrically connected with the third node;

a control electrode of the eighth transistor is electrically connected with the first scan signal terminal, a first electrode of the eighth transistor is electrically connected with a control signal terminal, and a second electrode of the eighth transistor is electrically connected with the first node;

one plate of the first capacitor is electrically connected with the fourth node, and the other plate of the first capacitor is electrically connected with a fourth power supply terminal or the first node; when the pixel circuit comprises the node control sub-circuit, the other plate of the first capacitor is electrically connected with the first node; and one plate of the second capacitor is electrically connected with the fifth node, and the other plate of the second capacitor is electrically connected with the second power supply terminal.

14. The pixel circuit according to claim 1, further comprising: a reset sub-circuit and/or a node control sub-circuit, the drive control sub-circuit comprises: a first transistor, a second transistor, a third transistor and a first capacitor, the light emitting control sub-circuit comprises a fourth transistor, the time-length control sub-circuit comprises a fifth transistor, a sixth transistor and a second capacitor, the reset sub-circuit comprises a seventh transistor, and the node control sub-circuit comprises an eighth transistor;

a control electrode of the first transistor is electrically connected with a fourth node, a first electrode of the first transistor is electrically connected with the second node, and a second electrode of the first transistor is electrically connected with the first node;

a control electrode of the second transistor is electrically connected with the first scan signal terminal, a first electrode of the second transistor is electrically connected with the first data signal terminal, and a second electrode of the second transistor is electrically connected with the fourth node;

a control electrode of the third transistor is electrically connected with a third scan signal terminal, a first electrode of the third transistor is electrically connected with the first data signal terminal, and a second electrode of the third transistor is electrically connected with the fourth node;

a control electrode of the fourth transistor is electrically connected with the light emitting signal terminal, a first electrode of the fourth transistor is electrically connected with the first power supply terminal, and a second electrode of the fourth transistor is electrically connected with the second node;

a control electrode of the fifth transistor is electrically connected with a fifth node, a first electrode of the fifth transistor is electrically connected with the first node, and a second electrode of the fifth transistor is electrically connected with the third node;

a control electrode of the sixth transistor is electrically connected with the second scan signal terminal, a first electrode of the sixth transistor is electrically connected with the second data signal terminal, and a second electrode of the sixth transistor is electrically connected with the fifth node;

a control electrode of the seventh transistor is electrically connected with a reset signal terminal, a first electrode of the seventh transistor is electrically connected with an initial signal terminal, and a second electrode of the seventh transistor is electrically connected with the third node;

a control electrode of the eighth transistor is electrically connected with the first scan signal terminal, a first electrode of the eighth transistor is electrically connected with a control signal terminal, and a second electrode of the eighth transistor is electrically connected with the first node;

one plate of the first capacitor is electrically connected with the fourth node, and the other plate of the first capacitor is electrically connected with a fourth power supply terminal or the first node; when the pixel circuit comprises the node control sub-circuit, the other plate of the first capacitor is electrically connected with the first node;

one plate of the second capacitor is electrically connected with the fifth node, and the other plate of the second capacitor is electrically connected with the second power supply terminal; and the second transistor and the third transistor are of opposite transistor types.

15. The pixel circuit according to claim 1, wherein the light emitting element comprises: a miniature light emitting diode or a mini light emitting diode.

16. A display substrate comprising: a display area provided with a plurality of pixels and a non-display area provided on and surrounding at least one side of the display area, wherein the pixel circuit according to claim 1 is provided in the pixels.

17. The display substrate according to claim 16, wherein the pixel circuit comprises: a node control sub-circuit, and the display substrate further comprises: a first chip connected with a control signal terminal and a second chip connected with the first data signal terminal;

the first chip is configured to provide a signal to the control signal terminal in a display stage, read a signal of the control signal terminal in a non-display stage, and is further configured to obtain a threshold voltage of a first transistor according to the signal of the control signal terminal, generate a control signal according to the threshold voltage of the first transistor, and send the control signal to the second chip; and the second chip provides a signal to the first data signal terminal according to the control signal.

18. A display device, comprising the display substrate according to claim 16.

19. A method for driving a pixel circuit, which is configured to drive the pixel circuit according to claim 1, the pixel circuit is located in a display substrate, the display substrate has a display stage, the display stage comprises a plurality of display frames, a display frame comprises at least one display sub-frame; the at least one display sub-frame comprises a light emitting data writing stage and a light emitting stage, and the method comprises:

the drive control sub-circuit providing a drive current to the first node under control of the first scan signal terminal, the first data signal terminal and the second node, and the time-length control sub-circuit providing the signal of the first node to the third node under control of the second scan signal terminal and the second data signal terminal in the light emitting data writing stage; and the light emitting control sub-circuit providing the signal of the first power supply terminal to the second node under control of the light emitting signal terminal in the light emitting stage.

20. The method according to claim 19, wherein the pixel circuit further comprises: a reset sub-circuit, the display sub-frame further comprises: a reset stage, and the method further comprises:

the reset sub-circuit providing a signal of an initial signal terminal to the third node under control of a reset signal terminal in the reset stage; or wherein the pixel circuit further comprises a node control sub-circuit, the display substrate further comprises a non-display stage, the non-display stage comprises a compensation data writing stage and a compensation stage, the method further comprises:

the node control sub-circuit providing a signal of a control signal terminal to the first node under control of the first scan signal terminal in the light emitting data writing stage and the compensation data writing stage; and the node control sub-circuit reading the signal of the first node to the control signal terminal under control of the first scan signal terminal in the compensation stage.

* * * * *